(12) United States Patent
Iwasaki

(10) Patent No.: US 6,560,412 B2
(45) Date of Patent: May 6, 2003

(54) ELECTRONIC FLASH CONTROLLING DEVICE

(75) Inventor: Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/062,436

(22) Filed: Feb. 5, 2002

(65) Prior Publication Data

US 2002/0154910 A1 Oct. 24, 2002

(30) Foreign Application Priority Data

Apr. 18, 2001 (JP) .......................... 2001-119962

(51) Int. Cl.⁷ .............................................. G03B 15/05
(52) U.S. Cl. ..................................................... 396/157
(58) Field of Search ........................................ 396/157

(56) References Cited

U.S. PATENT DOCUMENTS 6,154,612 A * 11/2000 Iwasaki ................. 396/157 X
6,167,202 A * 12/2000 Fukui ........................ 396/157
6,272,292 B1 * 8/2001 Iwasaki et al. ............. 396/157

FOREIGN PATENT DOCUMENTS

JP          4-182631 A      6/1992    ............ G03B/7/16

* cited by examiner

*Primary Examiner*—W. B. Perkey
(74) *Attorney, Agent, or Firm*—Oliff & Berridge, PLC

(57) ABSTRACT

An electronic flash controlling device controls a flash light emitting unit that performs a main light emission and a preliminary light emission prior to the main light emission. A maximum preliminary light emission quantity setting unit sets a maximum preliminary light emission quantity for the preliminary light emission during which a smaller quantity of light is emitted than a maximum light emission quantity based upon maximum light emission quantity information regarding a total light emission quantity which the flash light emitting unit is capable of generating. A preliminary light emission executing unit engages the flash light emitting unit in the preliminary light emission by using the maximum preliminary light emission quantity set by the maximum preliminary light emission quantity setting unit as an upper limit.

12 Claims, 17 Drawing Sheets

B2, B3, B4, B1, B5

B | G | R

ELECTRONIC FLASH CONTROLLING DEVICE

INCORPORATION BY REFERENCE

The disclosure of the following priority application is herein incorporated by reference: Japanese Patent Application No. 2001-119962 filed Apr. 18, 2001.

BACKGROUND OF THE INVENTION

1. Field of the Invention

The present invention relates to an electronic flash controlling device capable of implementing optimal control on flash light emission quantity.

2. Description of Related Art

Devices that are employed to control the flash light emission quantity in related art include the one disclosed in Japanese Laid-Open Patent Publication No. H 4-182631. This electronic flash controlling device performs a preliminary light emission prior to the main light emission by a flash light emitter when performing a photographing operation with a single lens reflex camera or the like. The preliminary light emission may be achieved by, for instance, repeatedly emitting a small predetermined quantity of light in correspondence to the type of flash light emitter used. In this device, the maximum number of such small light emissions to be performed is set in advance, in order to ensure that a sufficient level of energy is left available for the main light emission after the preliminary light emission is implemented.

However, the flash light emitter is often exchangeable. In the device described above, a single value is set for the maximum number of small light emissions for the preliminary light emission regardless of the type of flash light emitter. For this reason, the onus to be borne during the preliminary light emission is bound to be large if a flash light emitter with a small maximum main light emission quantity for the main light emission is mounted in the camera, which poses problems in that the main light emission becomes disabled and in that a sufficient quantity of light is not emitted during the main light emission.

SUMMARY OF THE INVENTION

An object of the present invention is to provide an electronic flash controlling device capable of assuring the required quantity of light to be emitted by a flash light emitter with a small maximum main light emission quantity during the main light emission even after a preliminary light emission.

In order to achieve the object described above, an electronic flash controlling device employed to control a flash light emitting unit that performs a main light emission and a preliminary light emission prior to the main light emission comprises a maximum preliminary light emission quantity setting unit that sets a maximum preliminary light emission quantity for the preliminary light emission during which a smaller quantity of light is emitted than a maximum light emission quantity based upon maximum light emission quantity information regarding a total light emission quantity which the flash light emitting unit is capable of generating; and a preliminary light emission executing unit that engages the flash light emitting unit in the preliminary light emission by using the maximum preliminary light emission quantity set by said maximum preliminary light emission quantity setting unit as an upper limit.

In order to achieve the object described above, an electronic flash controlling system comprises a camera main body having a maximum preliminary light emission quantity setting unit that sets a maximum preliminary light emission quantity for a preliminary light emission during which a smaller quantity of light is emitted than a maximum light emission quantity, based upon maximum light emission quantity information regarding a total light emission quantity which a flash light emitting unit is capable of generating, and a preliminary light emission executing unit that issues an instruction to perform the preliminary light emission to the flash light emitting unit by using the maximum preliminary light emission quantity set by said maximum preliminary light emission quantity setting unit as an upper limit; and an electronic flash device that can be detachably mounted at said camera main body, having said flash light emitting unit that performs a main light emission and the preliminary light emission prior to the main light emission and a preliminary light emission regulating unit that regulates said flash light emitting unit to disallow a preliminary light emission which results in a light emission quantity exceeding a predetermined preliminary light emission quantity even if the instruction has been issued from said camera main body to perform the preliminary light emission which results in the light emission quantity exceeding the predetermined preliminary light emission quantity.

DESCRIPTION OF PREFERRED EMBODIMENTS

The electronic flash controlling device according to the present invention sets the maximum light emission quantity for a preliminary light emission preceding the main light emission based upon the maximum main light emission quantity of the electronic flash device. The following is a detailed explanation given in reference to the drawings.

Figure 1:
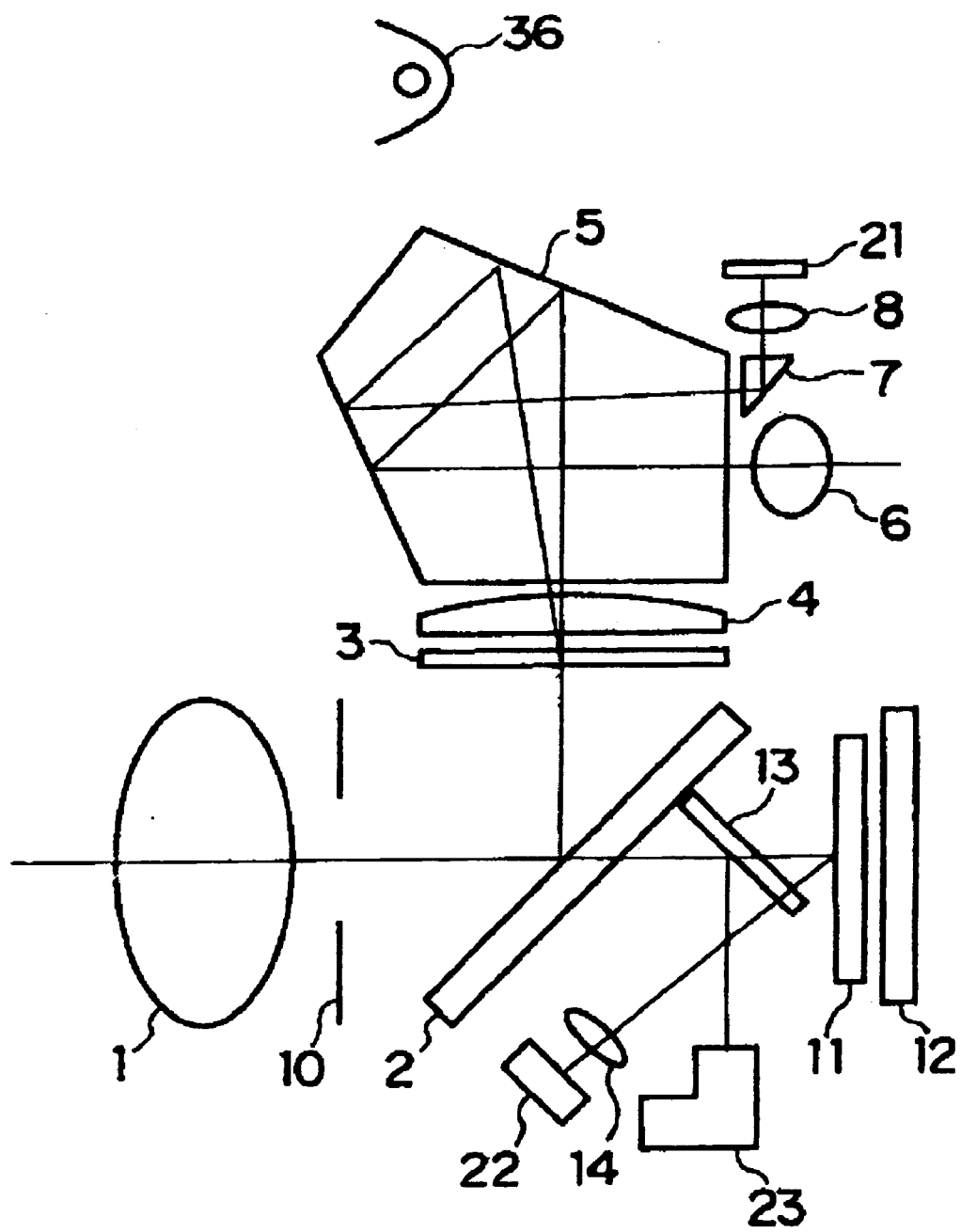
FIG. 1 schematically illustrates the optical system of a camera mounted with an electronic flash controlling device achieved in an embodiment of the present invention.

FIG. 1 schematically illustrates the optical system of a camera mounted with the electronic flash controlling device achieved in an embodiment of the present invention. The explanation is given on an example in which the electronic flash controlling device in the embodiment of the present invention is adopted in an digital still camera.

A light flux (ambient light) having passed through a photographic lens 1 is reflected at a main mirror 2 and forms an image on a diffusing screen 3. Then, it travels through a condenser lens 4, a pentaprism 5 and an eyepiece lens 6 to reach the photographer's eye.

Part of the light flux diffused at the diffusing screen 3 re-forms an image on an ambient light metering unit 21 through the condenser lens 4, the pentaprism 5, a photometering prism 7 and a photometering lens 8.

The main mirror 2 is a half mirror which allows part of the light to be transmitted. The light flux that has been transmitted through the main mirror 2 instead of having been reflected at the main mirror 2 is bent in the downward direction in FIG. 1 at a sub mirror 13 to be guided to a focal point detection unit 23.

Figure 2:
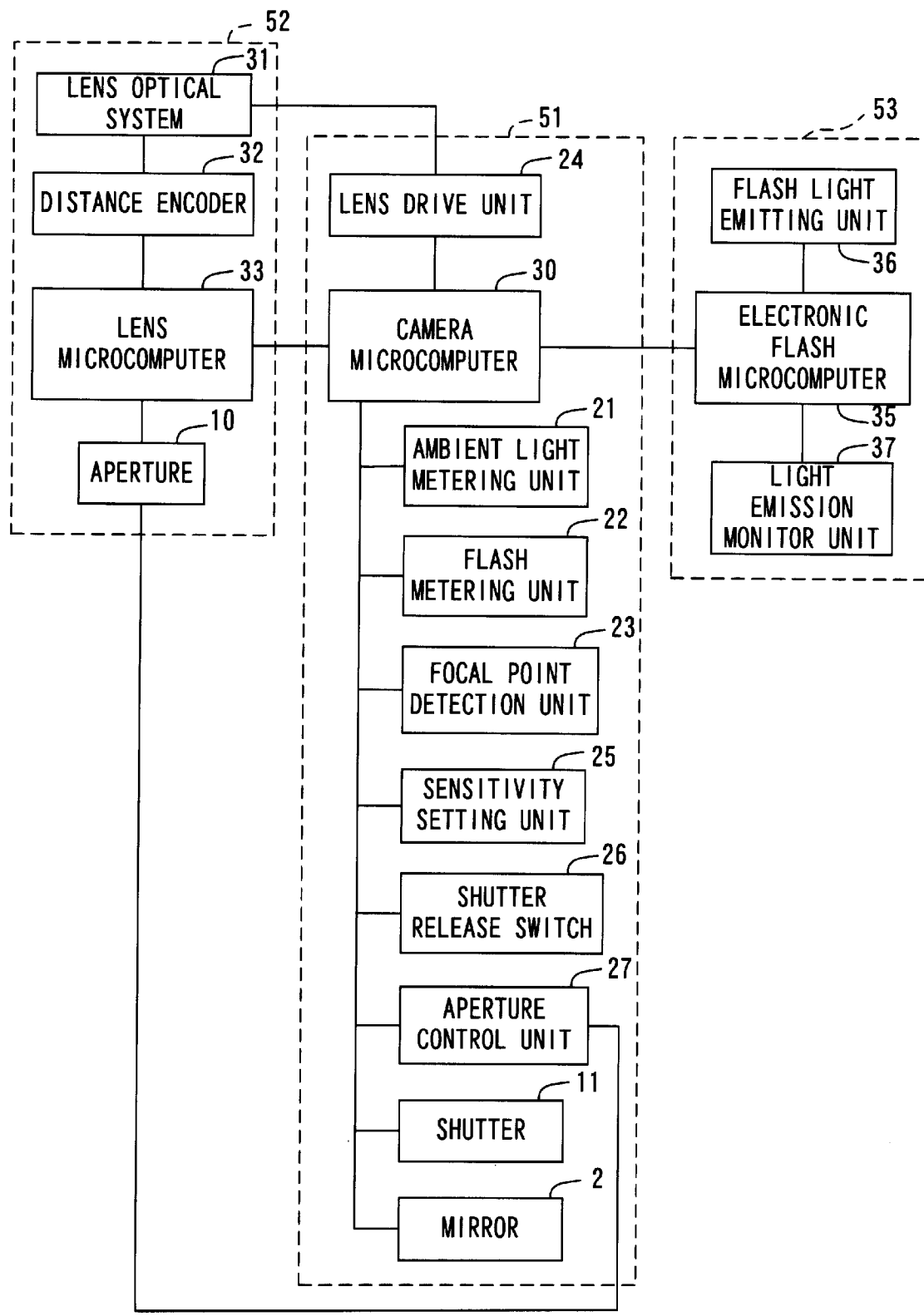
FIG. 2 is a block diagram of the structure of the electronic flash controlling device in the embodiment of the present invention.

When a shutter release switch 26 in FIG. 2 is operated, an aperture 10 is constricted to a predetermined value and, at the same time, the main mirror 2 swings upward. Subsequently, a preliminary light emission is performed at a flash light emitting unit 36 included in an electronic flash device 53 detachably mounted at the camera body 51, in order to ascertain the photographic field state. At this time, a portion of the light reflected from the photographic field is reflected on a shutter 11 and is guided to a flash metering unit 22 through a flash control lens 14. The flash light emitting unit 36 performs a main light emission after the preliminary light emission. The shutter 11 is opened during this process so that the reflected light from the photographic field having passed through the photographic lens 1 forms an image on the light-receiving surface of an image-capturing element 12, which may be constituted of, for instance, a CCD.

Figure 3A:
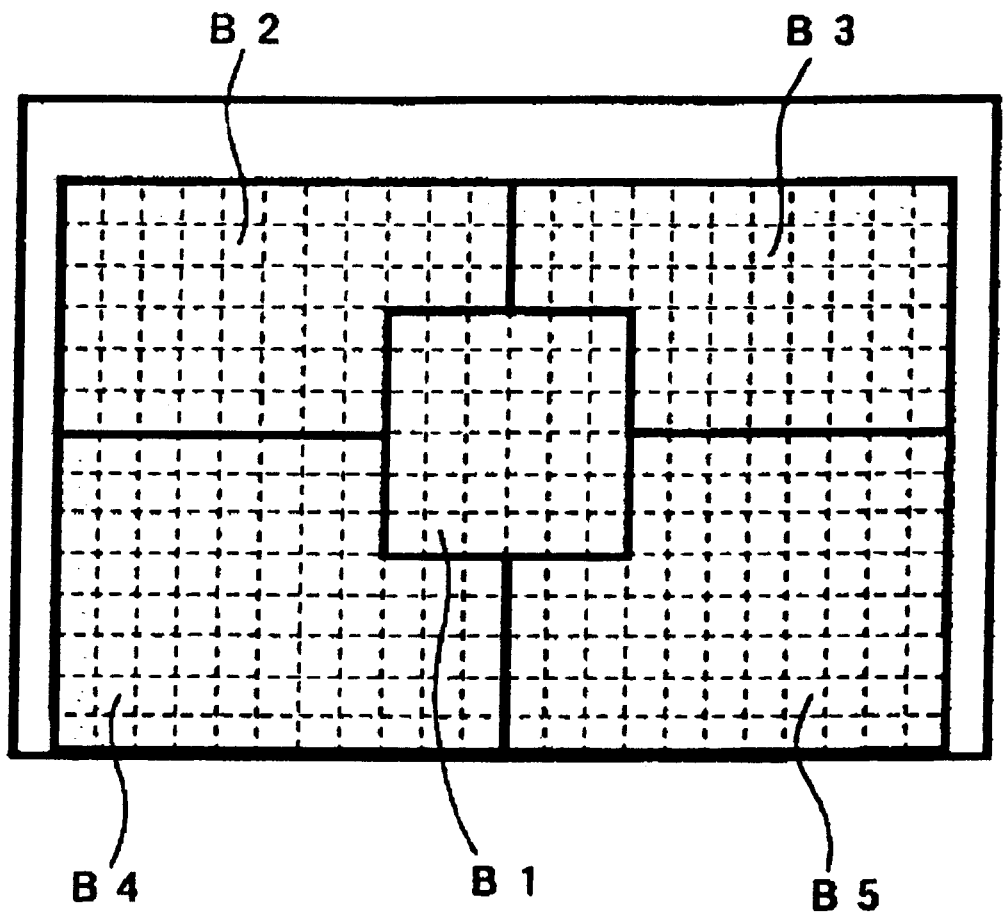
FIG. 3A shows the photometering areas set in the ambient light metering unit of the electronic flash controlling device in the embodiment.
Figure 3B:
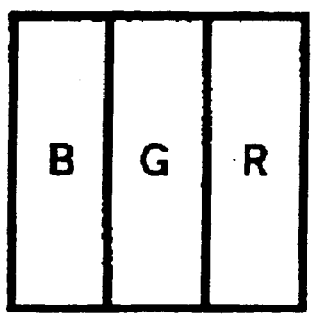
FIG. 3B shows that each of the photometering areas in FIG. 3A is divided into photometering areas corresponding to three different colors, i.e., red, green and blue.

The ambient light metering unit 21 is constituted of a light-receiving element such as a CCD (charge coupled device) and the like. The ambient light metering unit 21 assumes a structure that allows it to perform a photometering operation at 330 small areas, for instance, achieved by dividing essentially the entire plane of the photographic field into 22 (across)×15 (down) areas, as illustrated in FIG. 3A, to output the photometering values corresponding to the individual areas. As shown in FIG. 3B, each photometering area includes photometering cells corresponding to three different colors, i.e., R (red), G (green) and B (blue), so as to enable a photometering operation to be performed by separating the light into the three different colors. In addition, the ambient light metering unit 21 is capable of outputting averaged photometering values corresponding to areas B1~B5 obtained by grouping the photometering areas in conformance to the area division at the flash metering unit 22, as shown in FIG. 3A. The ambient light metering unit 21 outputs the photometering values corresponding to the individual areas to a camera microcomputer 30 to be detailed later.

Figure 4A:
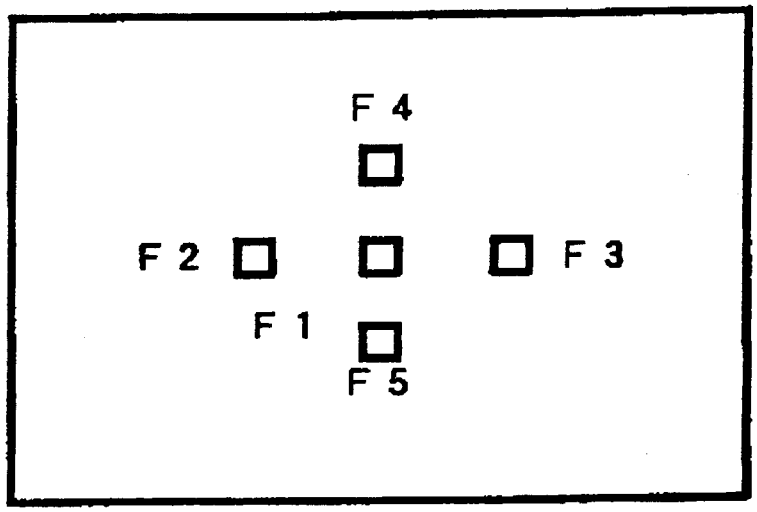
FIG. 4A shows areas set in the focal point detection unit in the electronic flash controlling device in the embodiment.
Figure 4B:
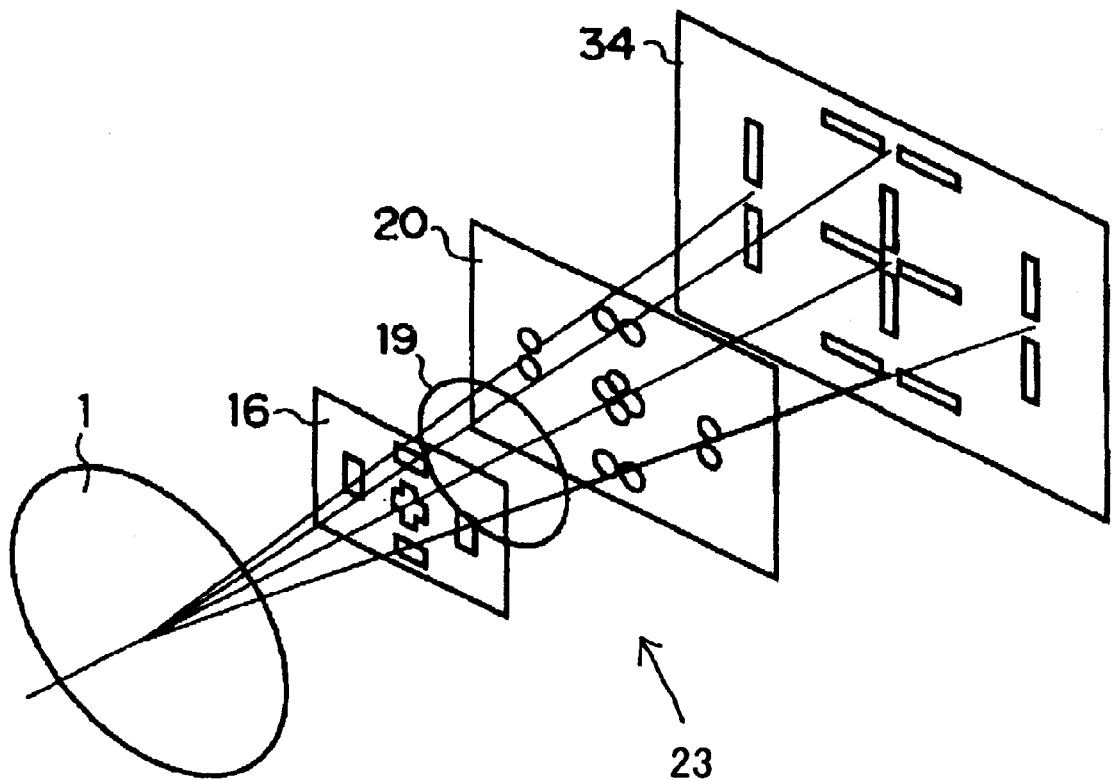
FIG. 4B shows the optical system of the focal point detection unit in the electronic flash controlling device in the embodiment.

FIG. 4A shows focal point detection areas F1~F5 in the photographic field and FIG. 4B shows the optical system of the focal point detection unit 23. As shown in FIG. 4B, the focal point detection unit 23 comprises the photographic lens 1, a field mask 16, a field lens 19, a separator lens 20, an autofocus sensor 34 and the like. The focal point detection unit 23 detects the focusing states in the focal point detection areas F1~F5 of the photographic field shown in FIG. 4A through a phase difference detection method or the like. The focal point detection unit 23 drives the photographic lens 1 until a focused state is achieved in one of the areas F1~F5. The focal. point detection area where a focused state is to be achieved is selected manually by the photographer, or selected through a closest subject distance selection in the camera or the like.

Figure 5:
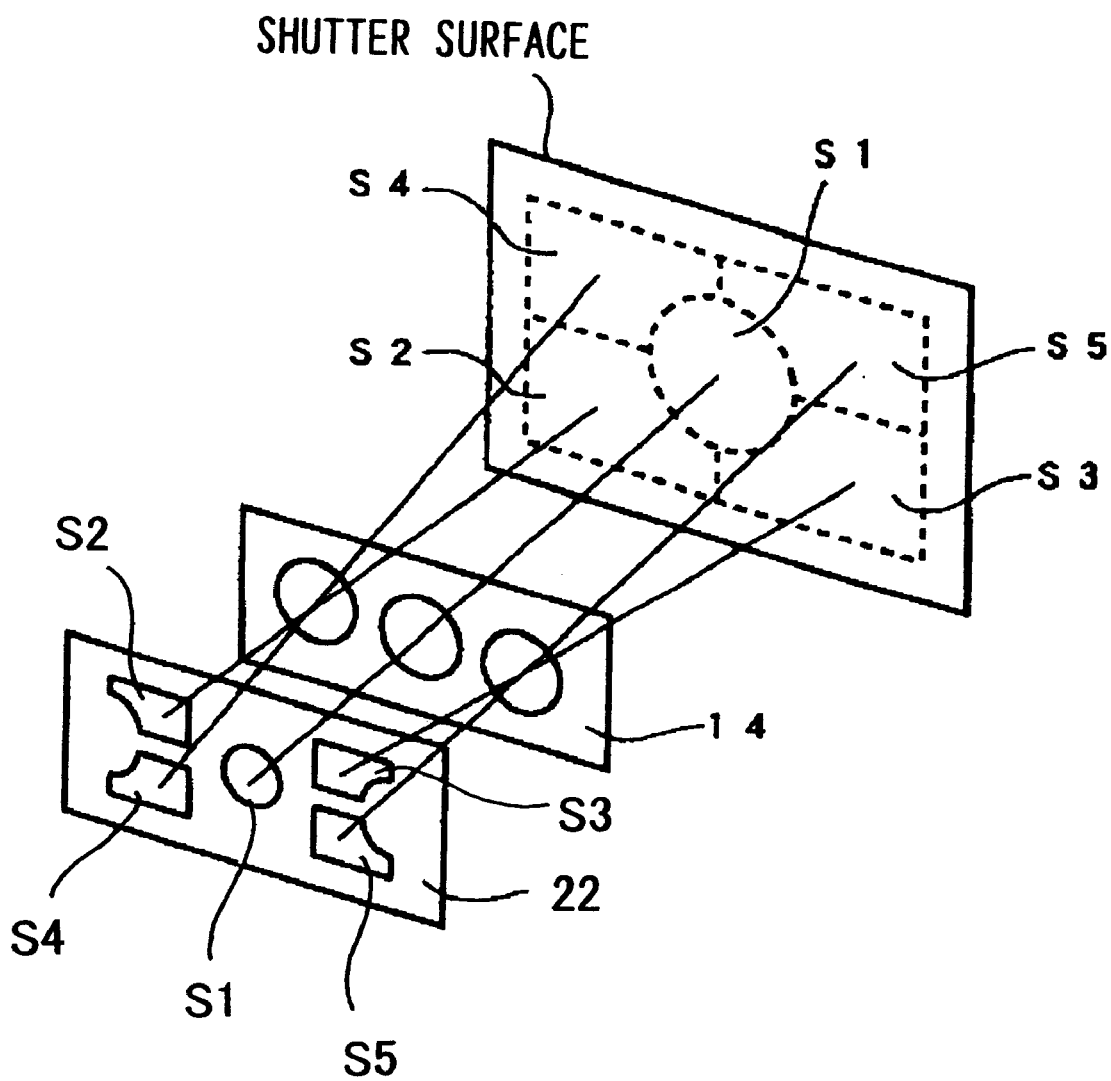
FIG. 5 shows the optical system of the flash metering unit and the area division achieved therein in the electronic flash controlling device in the embodiment.

The flash metering unit 22 is constituted of a light-receiving element such as a silicon photodiode (SPD), capacitors that store the photocurrents from the SPD, amplifiers (not shown) and the like. As shown in FIG. 5, the subject image formed by the light having entered the shutter surface 11 is reformed at the light-receiving element of the flash metering unit 22 via the flash control lens 14, which includes three lenses. The light-receiving element of the flash metering unit 22 is divided into 5 areas S1~S5 in correspondence to the areas B1~B5 obtained by dividing the photographic field as shown in FIG. 3A. The flash metering unit 22 individually stores the charges resulting from the photoelectric conversion performed in the areas S1~S5 and the amplification at the amplifiers into the capacitors corresponding to the areas S1~S5. It is to be noted that the areas S1~S5 correspond to the areas B1~B5 at the ambient light metering unit 21 shown in FIG. 3A. A more detailed explanation is to be given later on the flash metering unit 22 in reference to FIG. 7.

Next, in reference to FIG. 2, the basic operation of a camera mounted with the electronic flash controlling device according to the present invention is explained. FIG. 2 is a block diagram showing the structure of the electronic flash controlling device achieved in the embodiment of the present invention. The basic operation described below is controlled by the camera microcomputer 30 at a camera main body 51. It is to be noted that the camera microcomputer 30, a lens microcomputer 33 at a lens main body 52 and an electronic flash microcomputer 35 at an electronic flash device 53 are each constituted of a microprocessor. The lens microcomputer 33 and the electronic flash microcomputer 35 are electrically connected with the camera microcomputer 30.

(1) Photometering * Exposure Control

The ambient light metering unit 21 described above outputs the photometering values from the photographic field divided into the 330 small areas to the camera microcomputer 30. Lens information such as the F-number, the focal length and the exit pupil position with regard to the photographic lens 1 stored in the lens microcomputer 33 is provided to the camera microcomputer 30.

The camera microcomputer 30 calculates the correct exposure value for ambient light exposure based upon the photometering values provided by the ambient light metering unit 21, the lens information provided by the lens microcomputer 33, information indicating the sensitivity of the image-capturing element 12 provided from a sensitivity setting unit 25 and the like. The camera microcomputer 30 determines an aperture value and a shutter speed based upon the correct exposure value and outputs the individual values to an aperture control unit 27 and the shutter 11. The aperture control unit 27 drives the aperture 10 at the lens main body 52 in conformance to the input value. An actuator (not shown) at the shutter 11 adjusts the shutter speed in conformance to the value input thereto.

It is to be noted that the aperture control unit 27 implements constrict/reset control on the aperture 10 in response to a shutter release signal from the shutter release switch 26, i.e., in response to a full press operation of the shutter release switch 26.

(2) Autofocus Control

The focal point detection unit 23 detects the focusing states in the five focal point detection areas F1~F5 shown in FIG. 4A. The focus information obtained through the detection performed by the focal point detection unit 23 is provided to the camera microcomputer 30.

The camera microcomputer 30 calculates a lens drive quantity so as to achieve a focused state in a given focal point detection area based upon the input focus information and outputs the calculated lens drive quantity to a lens drive unit 24. The lens drive unit 24 drives a lens optical system 31 at the lens main body 52 so as to achieve a focused state in correspondence to the input lens drive quantity. At this time, the distance over which the lens optical system 31 has moved is detected by a distance encoder 32 and the detected distance is provided to the camera microcomputer 30 via the lens microcomputer 33.

(3) Flash Control

The camera microcomputer 30 calculates gain settings at the amplifiers each corresponding to one of the areas S1~S5 at the flash metering unit 22, based upon the photometering values, the aperture value, the sensitivity value and the distance value described above, the bounced state at the flash light emitting unit 36 and the like. Then, the camera microcomputer 30 sets the gains for the amplifiers in the flash metering unit 22. Once the gains are set, the camera microcomputer 30 engages the flash light emitting unit 36 in a preliminary light emission through the electronic flash microcomputer 35 at the electronic flash device 53. During this process, the flash metering unit 22 stores the photocurrents corresponding to the quantity of reflected light from the subject. The camera microcomputer 30 calculates an instruction value for the main light emission quantity based upon the integrated value obtained at the flash metering unit 22 and outputs the instruction value thus calculated to the electronic flash microcomputer 35.

The electronic flash microcomputer 35 calculates the main light emission quantity based upon the main light emission quantity instruction value input thereto and the preliminary light emission value detected by a light emission monitor unit 37 provided at the electronic flash device 53. The electronic flash microcomputer 35 then engages the flash light emitting unit 36 in the main light emission in response to a light emission trigger signal (X signal) provided by the camera microcomputer 30. The electronic flash microcomputer 35 controls the main light emission quantity based upon the integrated value obtained through main light emission integration performed at the light emission monitor unit 37 and the main light emission quantity that has been calculated. The camera microcomputer 30 and the electronic flash microcomputer 35 engages in operation together as a preliminary light emission executing unit.

As described above, the camera mounted with the electronic flash controlling device according to the present invention performs a preliminary light emission in order to ascertain the state of the photographic field prior to the main light emission by the flash light emitting unit 36 during a photographing operation. The preliminary light emission may be achieved either through a single light emission in which a small quantity of light is emitted compared to the main light emission quantity, or through several small light emissions repeated over a small length of time at a predetermined light emission quantity. In the embodiment, the preliminary light emission is achieved through several small light emissions are repeated over short intervals.

The light quantity GNp1 per small light emission performed during the preliminary light emission and the maximum main light emission quantity, i.e., the light quantity GNh achieved through a full light emission normally vary depending upon the type of the electronic flash device 53 mounted at the camera main body 51. Thus, if a preliminary light emission is performed with the maximum number of small light emissions set at a fixed value regardless of the type of electronic flash device mounted at the camera main body 51, the main light emission may become disabled or a sufficient quantity of light may not the emitted during the main light emission.

For instance, when there are two electronic flash devices with the light quantities GNp1 per small light emission equal to each other but different maximum main light emission quantities GNh from each other, a larger onus is placed on the electronic flash device with the smaller maximum main light emission quantity GNh during the preliminary light emission. In other words, when preliminary light emissions are performed by the two electronic flash devices through a given number of small light emissions, the ratio of the preliminary light emission quantity to the entire light emission quantity is larger in the electronic flash device with the smaller maximum main light emission quantity GNh than in the electronic flash device with the larger maximum main light emission quantity GNh. As a result, a smaller quantity of energy will be left for the main light emission in the electronic flash device with the smaller maximum main light emission quantity GNh. If, on the other hand, the two electronic flash devices have maximum main light emission quantities GNh equal to each other, the electronic flash device with the larger light quantity GNp1 per small light emission will be left with a smaller quantity of energy available for the main light emission.

Accordingly, in order to ensure that the absolute minimum energy required for the main light emission is left, the upper limit Qpre_max to the number of small light emissions performed during the preliminary light emission should be varied in conformance to the characteristics of the electronic flash device in use.

In the electronic flash controlling device according to the present invention, the upper limit to the number of small light emissions, i.e., the maximum light emission quantity for the preliminary light emission, is adjusted in conformance to the characteristics of the electronic flash device 53 mounted at the camera main body 51. The following is a detailed explanation of the method employed to calculate the upper limit Qpre_max to the number of small light emissions.

Information indicating the maximum main light emission quantity GNh and the light emission quantity GNp1 per small light emission at the electronic flash device 53 is provided to the camera microcomputer 30 at the camera main body 51 from the electronic flash microcomputer 35 of the electronic flash device 53. The upper limit Qpre_max to the number of small light emissions is calculated at a maximum preliminary light emission quantity setting unit (not shown) provided at the camera microcomputer 30.

The total light emission quantity Gt when n light emissions have been performed with a guide number GNp1 is calculated through the following formula $$Gt = GNp1 \times \sqrt{n} \quad \text{(expression 1)}$$

However, the quantity of energy consumed through this process cannot be determined through (expression 1), presumably because it does not incorporate the quantity of energy expended in generating a trigger for causing the electronic flash device to emit light or the light emission efficiency corresponding to the light emission quantity. For this reason, when attempting to allocate a specific quantity of energy for the preliminary light emission in an electronic flash device with a predetermined maximum main light emission quantity GNh and a predetermined small light emission quantity GNp1, it is difficult to calculate the optimal upper limit Qpre_max to the number of small light emissions through an energy conversion formula such as that presented in (expression 1). Accordingly, the optimal upper limit Qpre_max to the number of small light emissions is calculated in the embodiment through an approximation which conforms to the values obtained through testing.

Examples of such an approximation are presented in (expression 2) and (expression 3).

$$Qpre\_max = GNh/GNp1 \quad \text{(expression 2)}$$

$$Qpre\_max = Hgn - Pgn - 30 \quad \text{(expression 3)}$$

In the expression above, $Hgn = 12 \times \log_2(GNh)$ and $Pgn = 12 \times \log_2(GNp1)$. It is to be noted that $\log_2()$ is a function which assumes a logarithm, the base of which is 2 in ( ).

Figure 6:
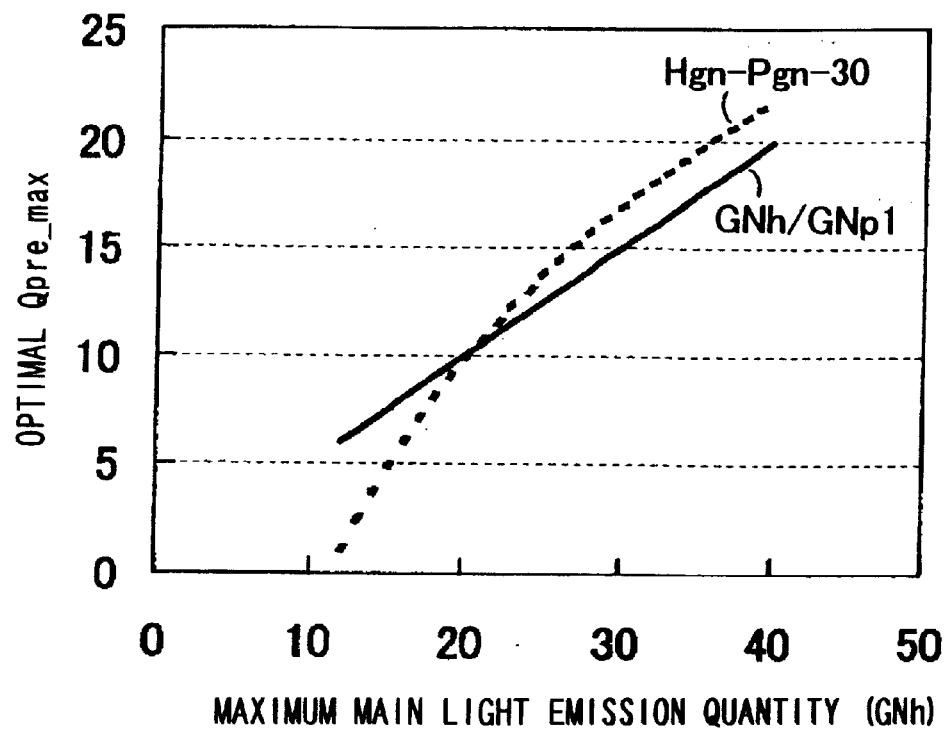
FIG. 6 illustrates in an approximation the relationship between the maximum main light emission quantity GNh and the optimal upper limit Qpre_max to the number of small light emissions.

FIG. 6 shows the relationships of the maximum main light emission quantity GNh to the optimal upper limits Qpre_max to the number of small light emissions calculated through (expression 2) and (expression 3). As shown in FIG. 6, the optimal upper limit Qpre_max to the number of small light emissions increases as the maximum main light emission quantity GNh increases, regardless of whether the approximation in (expression 2) or (expression 3) is used. It is to be noted that the upper limit Qpre_max to the number of small light emissions calculated through this process is a value which does not include the number of blank shots made at the flash light emitting unit 36.

(expression 3) represents an example of a relatively simple approximation through which the upper limit Qpre_max to the number of small light emissions may be calculated by providing the maximum main light emission quantity GNh and the light emission quantity GNp1 per small light emission at the electronic flash device 53 from the electronic flash microcomputer 35 to the camera microcomputer 30 as Hgn and Pgn respectively. It is to be noted that the approximation used to calculate the optimal upper limit Qpre_max to the number of small light emissions is not limited to (expression 2) or (expression 3) given above, and any appropriate approximation that conforms to values obtained through testing may be used.

As explained above, the electronic flash controlling device in the embodiment calculates the upper limit Qpre_max to the number of small light emissions performed during the preliminary light emission through an approximation and implements preliminary light emission control accordingly.

Next, a flash photographing operation performed in a camera mounted with the electronic flash controlling device in the embodiment is explained.

Figure 7:
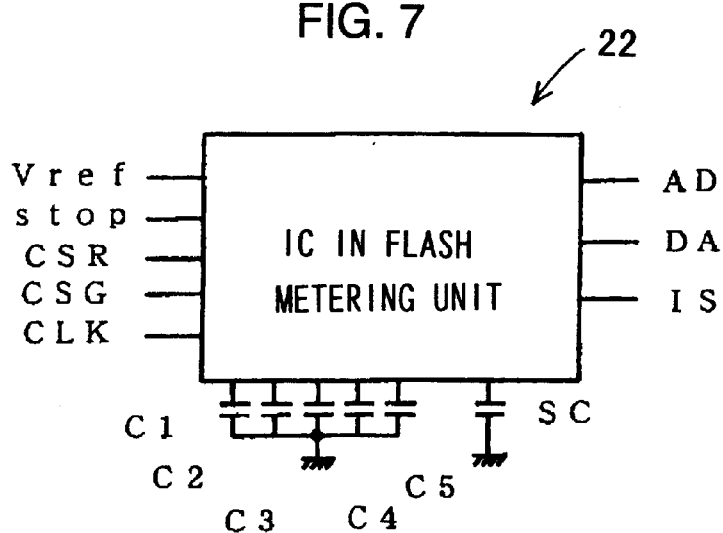
FIG. 7 shows the terminals of the flash metering unit.

First, a detailed explanation is given on the flash metering unit 22 that meters reflected light from the photographic field during the preliminary light emission at the electronic flash device 53. FIG. 7 illustrates the integrated circuit (hereafter referred to as an IC) achieved, at the flash metering unit 22 and the terminals provided at the IC.

As shown in FIG. 7, external capacitors C1~C5 that respectively store the photocurrents in the five photometering areas S1~S5 shown in FIG. 5 and an external capacitor SC that adds the photocurrents in the areas S1~S5 together and stores the total photocurrent in order to output a stop signal for stopping the preliminary light emission are connected to the IC at the flash metering unit 22. Vref indicates a temperature-proportionate voltage terminal and stop indicates a stop signal output terminal. CSR, CSG and CLK are terminals used to switch between the channel setting for setting amplifier gains for the individual areas S1~S5 and the channel setting for reading out the photocurrents having been stored in the capacitors C1~C5. IS indicates a terminal through which control is implemented to start/end storing the photocurrents in the capacitors C1~C5 and SC, DA indicates a terminal through which the amplifier gains calculated by the camera microcomputer 30 in correspondence to the individual areas S1~S5 are input as analog voltages and AD indicates an output terminal through which integrated photometering values corresponding to the areas S1~S5 having been stored in the capacitors C1~C5 respectively are read out. It is to be noted that these terminals are connected to the camera microcomputer 30.

Figure 8:
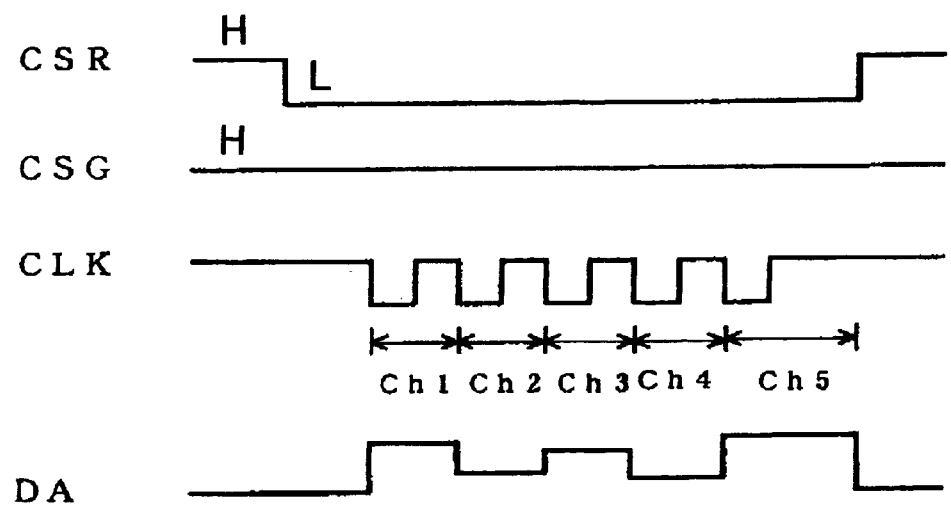
FIG. 8 shows a method that may be employed to set the gains at the amplifiers in the flash metering unit.

FIG. 8 shows the method of setting the amplifier gains for the signals output from the areas S1~S5 at the flash metering unit 22. The terminals CSR, CSG and CLK are each controlled by the camera microcomputer 30 so as to set the signal levels. The CSR terminal is set to low level (L level) while sustaining the CSG terminal at high level (H level). Then, as a clock signal is input to the CLK terminal, a channel among Ch1~Ch5 is selected in synchronization to a fall of the CLK terminal to L level.

While the CLK terminal is at L level, i.e., while a given channel is selected, a gain for the channel is set by setting the DA terminal to the voltage level corresponding to the amplifier gain. It is to be noted that the channels Ch1~Ch5 respectively correspond to the areas S1~S5. The method employed to calculate the amplifier gains for the areas S1~S5 at the camera microcomputer 30 is to be detailed later.

Figure 9:
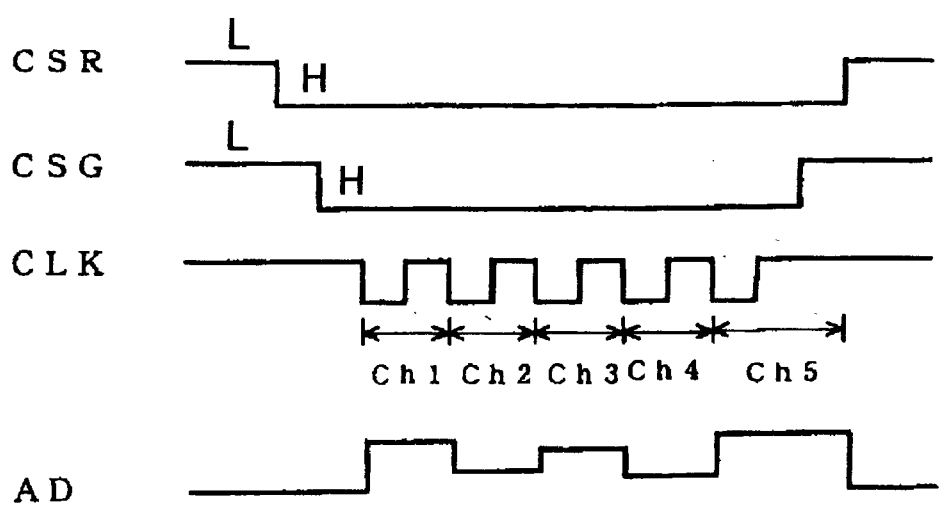
FIG. 9 shows a method that may be adopted to read out the integrated photometering values obtained at the flash metering unit.

FIG. 9 shows the method of reading out the integrated photometering values corresponding to the individual areas S1~S5 at the flash metering unit 22. The CSR terminal and the CSG terminal are set to L level. Then, a channel among Ch1~Ch5 is selected in synchronization with a fall of the CLK terminal to L level by inputting a clock signal to the CLK terminal. During this process, the integrated photometering values from the individual areas S1~S5 corresponding to the channels Ch1~Ch5 are output to the AD terminal as voltage levels reflecting the individual integrated photometering values. The integrated photometering values are transmitted to the camera microcomputer 30 from the AD terminal.

Figure 10:
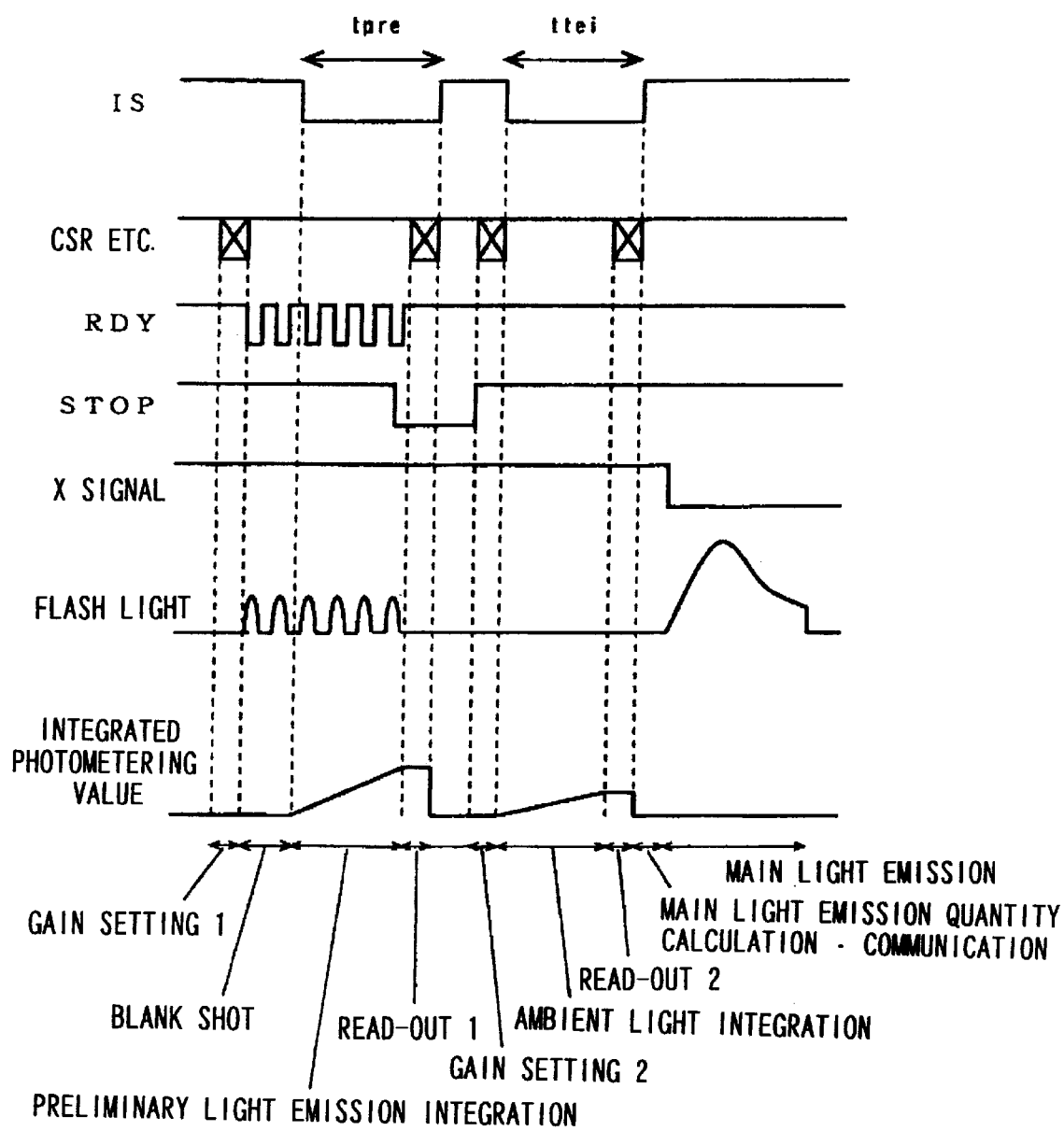
FIG. 10 illustrates a light emitting operation performed by the electronic flash controlling device achieved in the embodiment.

FIG. 10 is provided to facilitate an explanation of the light emitting operation performed at the electronic flash controlling device in the embodiment. The light emitting operation in this figure roughly corresponds to steps S113~S124 in the flowchart provided in FIG. 17, which is to be explained in detail later.

As a shutter release signal is input to the camera microcomputer 30 by pressing the shutter release switch 26 all the way down and the constriction of the aperture 10 is completed, gains are set (gain setting 1) at the flash metering unit 22. At this time, control is implemented on the CSR terminal, the CSG terminal, the CLK terminal and the DA terminal as shown in FIG. 8 to set amplifier gains for the signals output from the individual areas S1~S5. Following the gain setting 1, two blank shots are performed at the flash light emitting unit 36 by emitting a small quantity of light in order to warm up the flash light emitting unit 36 and the flash metering unit 22. After the two blank shots, the IS terminal is set to L level and a preliminary light emission is performed at the flash light emitting unit 36 through repeated small light emissions and, at the same time, storage of photocurrents (preliminary light emission integration) in the capacitors C1~C5 and SC at the flash metering unit 22 starts. It is to be noted that the small light emissions for the blank shots and the preliminary light emission are performed in response to an input of a clock signal to a communication line (hereafter referred to as an RDY terminal) that connects the camera microcomputer 30 to the electronic flash microcomputer 35.

The preliminary light emission ends once a stop signal is output after the integrated photometering value at the capacitor SC which stores the total of the photocurrents in the areas S1~S5 reaches an appropriate level or after the number of small light emissions reaches the upper limit Qpre_max explained earlier. The CSR terminal, the CSG terminal, the CLK terminal and the AD terminal are controlled as shown in FIG. 9 to read out the integrated photometering values corresponding to the individual areas S1~S5 (read-out 1). Then, the IS terminal is turned up to H level to reset the individual integrated values.

It is to be noted that an integrated value obtained through the preliminary light emission includes the quantity of light attributable to the ambient light as well as the quantity of reflected light resulting from the preliminary light emission. Accordingly, an integration operation is performed exclusively for the ambient light after the preliminary light emission is completed as described below, and then the ambient light component is subtracted from the integrated preliminary light emission value through arithmetic processing subsequently executed at the camera microcomputer 30 to calculate the integrated value corresponding to the preliminary light emission alone.

When the level of the stop signal rises to H level, gains are set (gain setting 2) at the ambient light metering unit 21 in order to perform ambient light integration. Then, as in the preliminary light emission, the IS terminal is turned down to L level and an integration operation (ambient light integration) is executed. At this time, the amplifier gains at the ambient light metering unit 21 are set equal to the amplifier gains at the flash metering unit 22 set through the gain setting 1, and the length of time over which the ambient light is to be integrated "ttei" is set equal to the length of time over which the light emitted through the preliminary light emission was integrated "tpre". Once the ambient light integration is completed, the integrated values corresponding to the individual areas B1~B5 are read out (read-out 2), and the integrated values are then reset by turning up the IS terminal to H level.

The main light emission quantity is calculated based upon an algorithm to be detailed later, a main light emission is executed by controlling the flash light emitting unit 36 based upon the calculated main light emission quantity during the photographing operation, and then the photographing operation ends.

Figure 11:
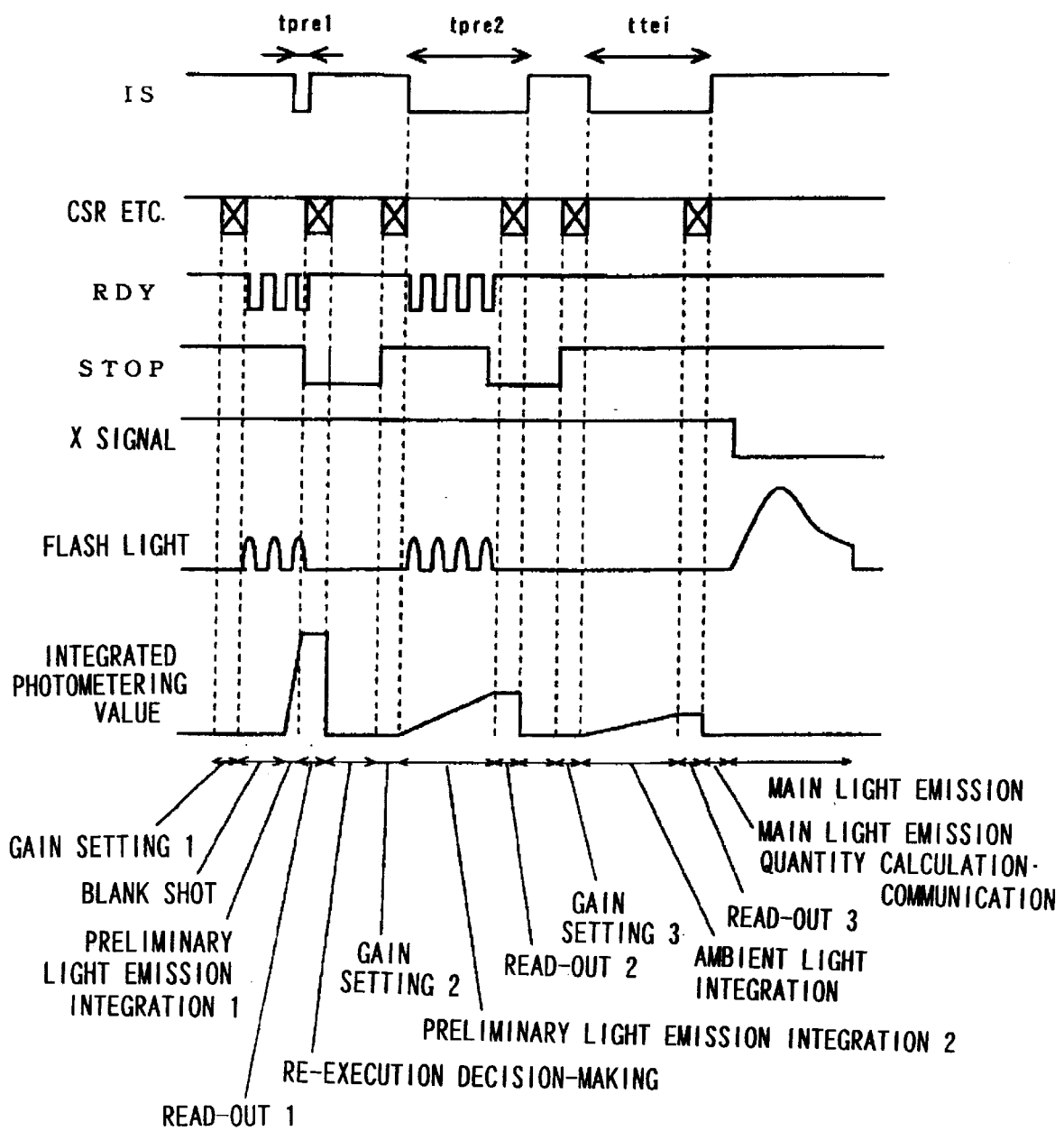
FIG. 11 illustrates a light emitting operation performed by the electronic flash controlling device achieved in the embodiment.

FIG. 11 is provided to facilitate an explanation of the light emission operation performed at the electronic flash controlling device when the preliminary light emission is executed again. In FIG. 11, a preliminary light emission integration starts as in FIG. 10 after making two blank shots following the gain setting 1. However, the integrated preliminary light emission value increases drastically after a single small light emission in FIG. 11, which results in an output of a stop signal to end the preliminary light emission. This may be caused by, for instance, the presence of a mirror or the like with a high reflectance in the photographic field. Since sufficient information on photographic field cannot be obtained in such a case amplifier gains are set again at the flash metering unit 22 (gain setting 2) to re-execute a preliminary light emission. The re-execution of the preliminary light emission and the method of setting the gains for the second preliminary light emission are to be detailed later.

The amplifier gains set at the flash metering unit 22 are calculated in correspondence to the individual areas S1~S5 by the camera microcomputer 30 based upon gain calculation command values $GaV(i)$ calculated through the formula presented in (expression 4) below.

$$GaV(i)=SvV+GnV+XmV+AvV+BvV(i)+BoV+ReV-Sa(i) \quad (i=1~5) \qquad \text{(expression 4)}$$

The unit of the gain calculation command values $GaV(i)$ is EV. The values 1~5 assumed for i correspond to the areas S1~S5 respectively. As the value of a gain calculation command value $GaV(i)$ calculated through (expression 4) increases, a higher gain is set at the flash metering unit 22. The following is an explanation of parameters used to calculate the gain calculation command values $GaV(i)$, given in reference to FIGS. 12 through 16.

Figure 12:
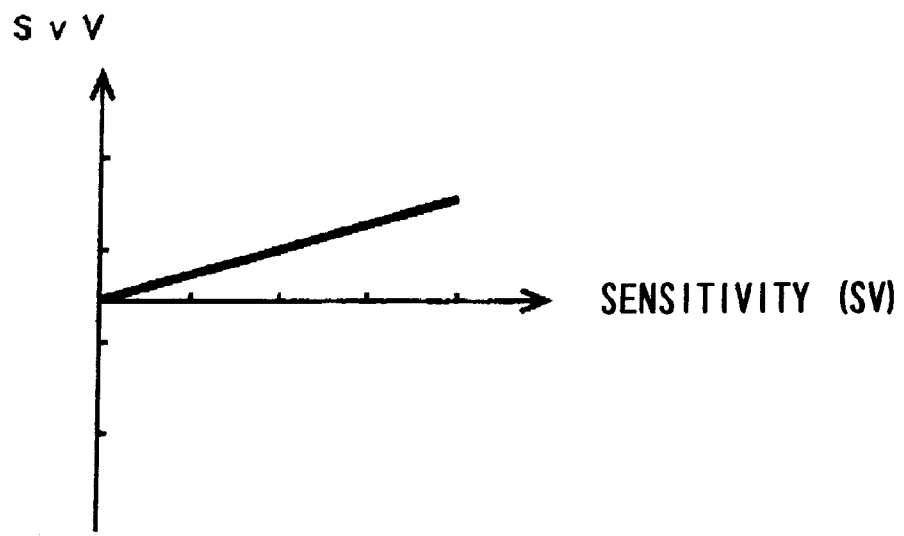
FIG. 12 schematically illustrates the relationship between the sensitivity SV of the image-capturing element and the gain.

$SvV$ represents the extent of change attributable to the sensitivity setting at the image-capturing element 12. As shown in FIG. 12, $SvV$ increases as the sensitivity SV of the image-capturing element 12 rises. As a result, the gain calculation command value $GaV(i)$, too, increases, since the distance over which correct exposure can be achieved extends further as the sensitivity SV at the image-capturing element 12 becomes higher, it becomes necessary to execute the preliminary light emission metering operation over a longer distance. However, as it is possible that a photographing operation is performed over a small distance even when the sensitivity SV is high, the extent of change in SvV is adjusted so as to not exceed 1 EV in correspondence to a change of 1 EV in the sensitivity SV to ensure that the sensitivity is not raised to an excessive degree.

Figure 13:
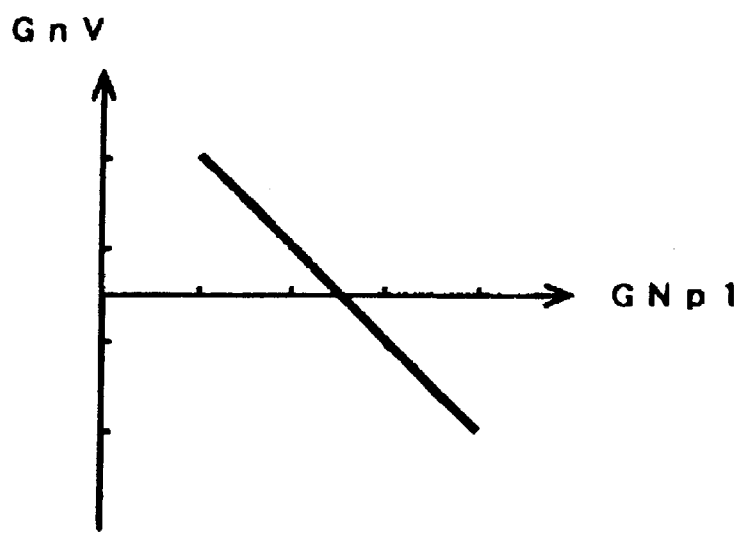
FIG. 13 schematically illustrates the relationship between the light emission quantity GNp1 per small light emission and the gain.

GnV represents the extent of change attributable to the light emission quantity GNp1 per small light emission. The quantity of light GNp1 generated through a small light emission changes depending upon the type of the electronic flash device 53 in use and the angle of flash light distribution. For this reason, GnV is set so as to achieve a constant photometering value regardless of the state of the electronic flash device 53. As shown in FIG. 13, GnV is set so that its value is reduced by 1 EV as the small light emission quantity GNp1 increases by 1 EV.

Figure 14:
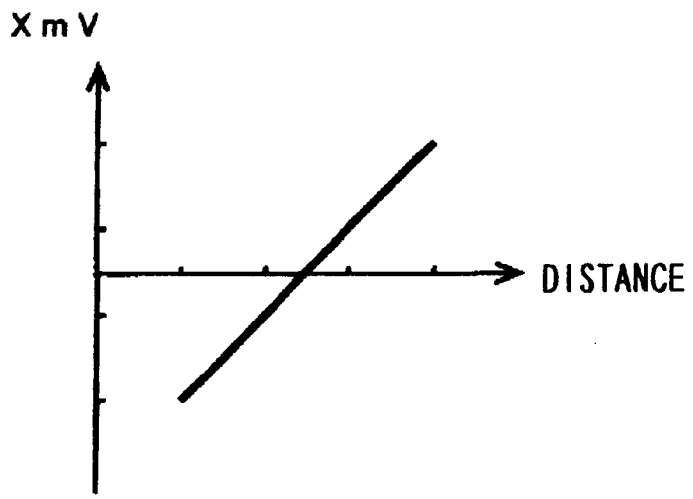
FIG. 14 schematically illustrates the relationship between the distance and the gain.

XmV is the extent of change occurring in correspondence to a change in the distance. XmV is set so as to achieve a constant photometering value regardless of the distance to the subject. As shown in FIG. 14, XmV is set so as to achieve an increase of 1 EV as the distance increases by an extent corresponding to 1 EV (to a distance multiplied by a factor of $\sqrt{2}$).

Figure 15:
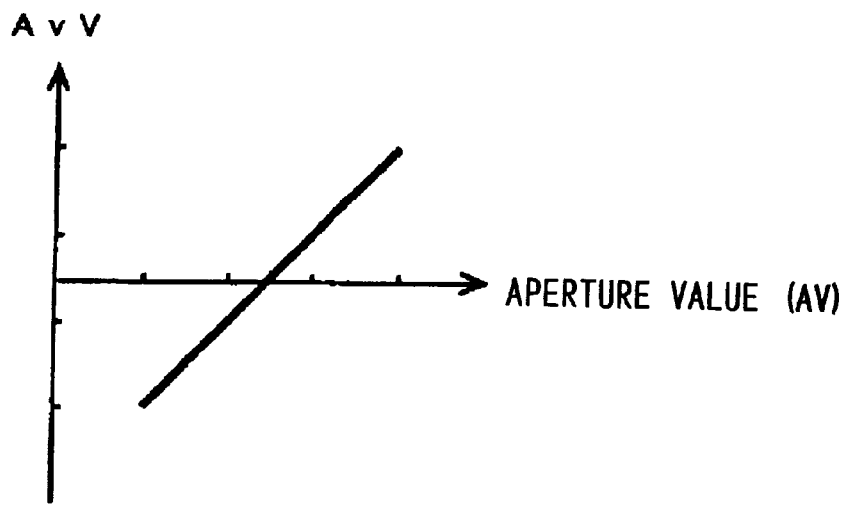
FIG. 15 schematically illustrates the relationship between the aperture value AV and the gain.

AvV represents the extent of the change attributable to the aperture value. AvV is set so as to achieve a constant photometering value at any aperture value. As shown in FIG. 15, AvV is set so that it increases by 1 EV as the aperture value increases by an extent corresponding to 1 EV (as the degree of darkness increases).

Figure 16:
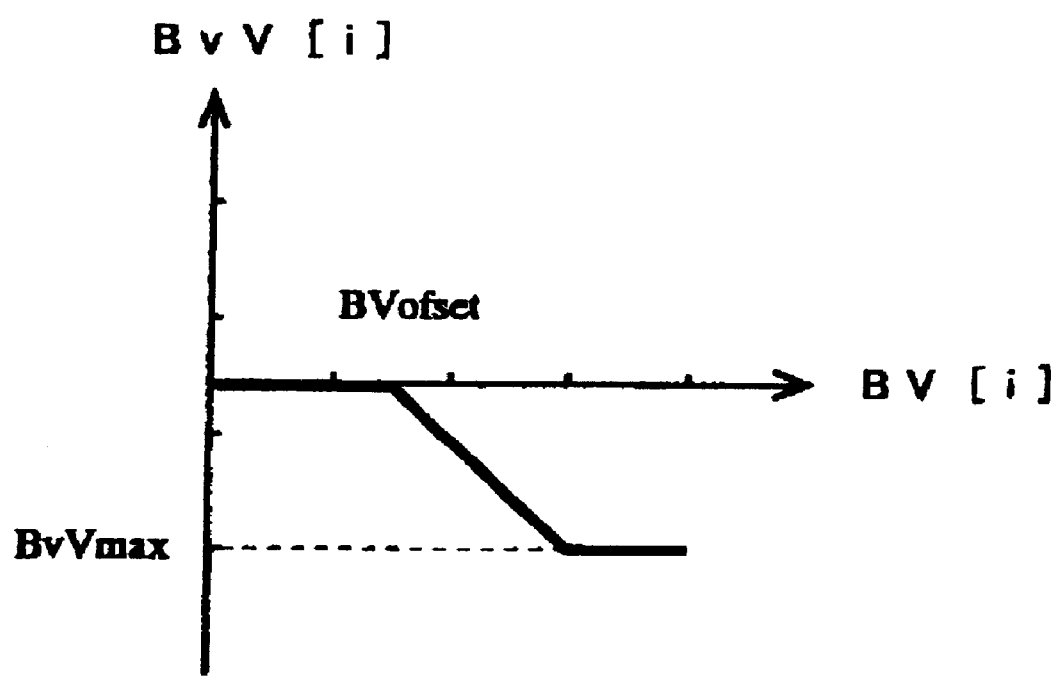
FIG. 16 schematically illustrates the relationship between the brightness BV and the gain.

BvV(i) represents the extent of change attributable to the brightness value. When the brightness of the ambient light increases, the ambient light may enter the flash metering unit 22 during the preliminary light emission to result in an output of a stop signal to end the integration operation before the integrated values of the reflected light resulting from the flash light generation are fully stored. For this reason, if the brightness BV of the ambient light is high, the gain calculation command value GaV(i) for the area where the brightness BV originates is set low. As shown in FIG. 16, BvV(i) is lowered by 1 EV as the brightness BV(i) increases by 1 EV once the brightness BV(i) exceeds a predetermined value BVofset. When the brightness BV(i) further increases and BvV(i) is lowered to a specific value BvVmax, BvV(i) becomes fixed at BvVmax.

BoV is a value which is varied depending upon whether or not the flash light is in a bounced state. In a normal state, i.e., if the flash light is not bounced, BoV is set to 0, whereas if the flash light is bounced, BoV is set to +2 EV. When the flash light is bounced, the subject is illuminated via a ceiling or the like, and thus, the quantity of reflected light from the subject is reduced. For this reason, the gain calculation command value GaV(i) is raised in a bounced state.

ReV is a value which is varied depending upon whether or not the preliminary light emission is to be re-executed. ReV is set to 0 for a first preliminary light emission. If it is decided that the preliminary light emission must be re-executed as explained later, −3 EV, for instance, is set for ReV to execute the second preliminary light emission at lowered gain settings.

Sa(i) represents a correction value which is calculated in correspondence to the type of the photographic lens 1 and the aperture value setting. The correction value Sa(i) is calculated for each of the areas S1~S5 by using a formula set in advance through testing or the like.

Figure 17:
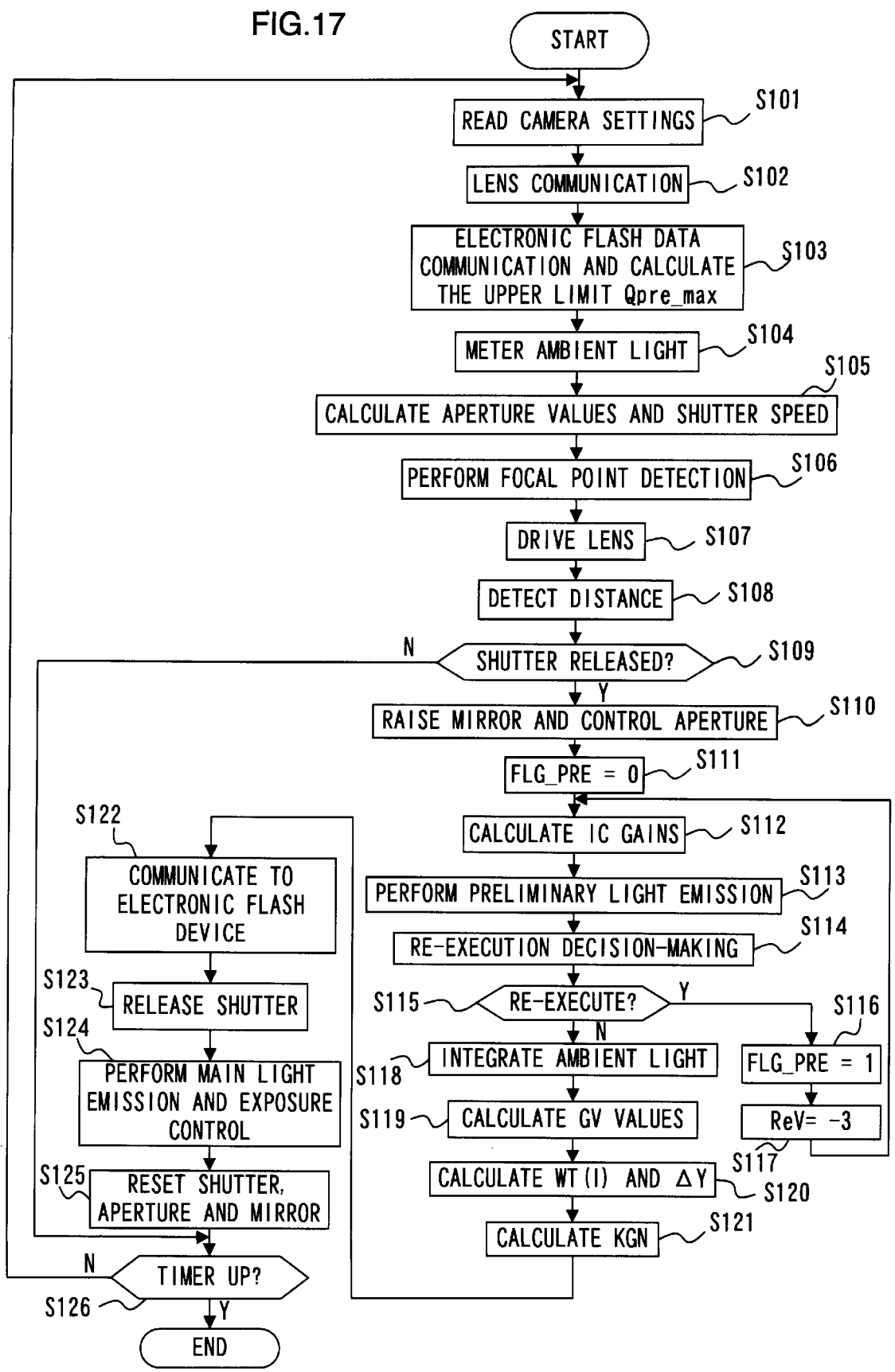
FIG. 17 is a flowchart of the processing executed in conformance to the electronic flash control program in the camera microcomputer in the electronic flash controlling device achieved in an embodiment of the present invention.

FIG. 17 presents a flowchart of the control procedure executed in conformance to a flash photographing control program in the camera microcomputer 30 of the electronic flash controlling device in the embodiment of the present invention. The following is an explanation of the flash photographing control achieved in the camera microcomputer 30, given in reference to the flowchart in FIG. 17. The program is started up when the shutter release switch 26 at the camera main body 51 is pressed halfway down. At this point, a halfway press timer (not shown) is activated.

In step S101, the various settings (the sensitivity, the photometering mode, the exposure mode and the like) at the camera are read out. In step S102, the focal length, the open aperture, the exit pupil distance, the distance data and the like with regard to the photographic lens are read out from the lens microcomputer 33 through lens communication. In step S103, the quantity of light GNp1 emitted through a single small light emission during the preliminary light emission, the maximum main light emission quantity GNh, the state of the flash light emitting unit 36 (whether or not the flash light is in a bounced state) and the like are read out through electronic flash device communication. In addition, the upper limit Qpre_max to the number of small light emissions for the preliminary light emission is calculated as explained earlier based upon the small light emission quantity GNp1 and the maximum main light emission quantity GNh.

In step S104, the ambient light metering unit 21 is engaged in an ambient light metering operation to calculate the photometering values for the areas B1~B5 and the like. In the following step S105, a correct exposure value Bvans is calculated through a method of the known art based upon the photometering values calculated in step S104 and the aperture value and the shutter speed are calculated in correspondence to the exposure mode setting.

In step S106, the focal point detection unit 23 is engaged in focal appoint detection in each of the focal point detection areas F1~F5. In step S107, the lens optical system 31 is driven so as to set the defocus quantity to 0 and achieve a focused state in a selected focal point detection area by controlling the lens drive unit 24 in conformance to the focal point detection state obtained in step S106. In step S108, the value representing the distance over which the lens optical system has moved, which has been detected by the distance encoder 32 and is regarded as the subject distance, is read out from the lens microcomputer 33.

In step S109, a decision is judged as to whether or not the shutter release switch 26 has been pressed all the way down. If an affirmative judgement is made in step S109, the operation proceeds to step S110. If, on the other hand, a negative judgement is made in step S109, the operation proceeds to step S126. In step S110, the main mirror 2 is allowed to swing upward and, at the same time, the aperture 10 is constricted.

Instep S111, 0 is set for a flag FLG_PRE which indicates a preliminary light emission is to be re-executed. In step S112, the gain calculation command values GaV(i) for the individual areas S1~S5 at the flash metering unit 22 are calculated through (expression 4) explained earlier. In step S113, a preliminary light emission is executed by engaging the electronic flash device 53. The preliminary light emission operation is to be explained in detail later in reference to the flowchart presented in FIG. 18.

In step S114, an arithmetic operation is performed for preliminary light emission re-execution decision-making, based upon the photometering values obtained at the flash metering unit 22. The preliminary light emission is re-executed if the preliminary light emission following the blank shots stops after a single small light emission and any of the integrated values IGpre(i) corresponding to the areas S1~S5 at the flash metering unit 22 has reached a saturation level stored in memory in advance. In step 115, a decision is judged as to whether or not the preliminary light emission is to be re-executed. If an affirmative judgement is made in step S115 and the preliminary light emission is to be re-executed, the operation proceeds to step S116. If, on the other hand, a negative judgement is made in step S115, the operation proceeds to step S118.

In step S116, 1 is set for the flag FLG_PRE that indicates thepreliminary light emission is to be re-executed. In step S117, −3 is set for the parameter ReV used to calculate the gain calculation command values GaV(i), then the operation returns to stepped S112 to recalculate the gain calculation command values GaV(i).

In step S118, the ambient light metering unit 21 is engaged in an ambient light integration operation and the integrated values IGtei(i) are read out. The ambient light integration operation is performed with gains set the same as those for the preliminary light emission integration operation and over the same length of operating time as that for the preliminary light emission integration operation. Namely, tpre=ttei in FIG. 10 and tpre2=ttei in FIG. 11.

In step S119, GV(i) (i=1~5) for the individual flash control areas S1~S5 are calculated based upon the integrated values obtained through the preliminary light emission and the like. Each GV(i) represents a variable related to the subject reflectance in one of the areas S1~S5. The unit of GV(i) is EV. GV(i) is calculated through the following formula in (expression 5).

$$GV(i)=\log2(GNp1)+\log2(Qpre)+GaV(i)+\log2(IGstop/IG(i))+Gofset \quad \text{(expression 5)}$$

In the expression above, Qpre represents the number of small light emissions performed in the preliminary light emission, which excludes the number of blank shots, and GaV(i) represents the gain calculation command values in the corresponding area among the areas S1~S5 calculated through (expression 4). In addition, IGstop represents the theoretical value of IG(i) taken when the stop signal is output. Gofset represents the offset value. It is to be noted that as expressed in (expression 6), IG(i) is obtained by subtracting the ambient light integrated value IGtei in a given area from the corresponding integrated preliminary light emission value IGpre(i).

$$IG(i)=IGpre(i)-IGtei(i)(IG(i)>0) \quad \text{(expression 6)}$$

In the following step S120, weights wt(i) for the individual areas S1~S5 and a level correction value ΔY are calculated through a method to be explained later, based upon the results of the calculation of GV(i) performed in step S119 and the like. The weights wt(i) and the level correction value ΔY are to be detailed later.

In step S121, a main light emission quantity instruction value kgn to be used when calculating the light emission quantity for the main light emission is calculated through the following formula in (expression 7).

$$kgn=\Delta Y-\log2(GNp1)-\log2(Qpre)-\log2(\Sigma(wt(i)/2^{GV(i)})+C \quad \text{(expression 7)}$$

In the expression above, C represents the offset value.

In step S122, the main light emission quantity instruction value kgn calculated in step S121 and the number of invalid small light emissions stn is provided to the electronic flash microcomputer 35 through communication.

The number of invalid small light emissions stn equals the number of blank shots (2) if it was judged in step S115 that the preliminary light emission was not to be re-executed. If, on the other hand, it was judged in step S115 that the preliminary light emission was to be re-executed and consequently, the preliminary light emission has been reexecuted, the number of invalid small light emissions equals the sum of the number of blank shots (2) and the first small light emission (1). It is to be noted that the electronic flash microcomputer 35 calculates the main light emission quantity for the main light emission to be performed by the light emitting unit 36 based upon the main light emission quantity instruction value kgn, the number of invalid small light emissions stn and the like input thereto.

In the following step S123, the shutter 11 is released. In step S124, the exposure control is implemented by controlling the shutter speed and a subject image is formed at the image-capturing element 12. Concurrently, the electronic flash microcomputer 35 implements light emission quantity control for the main light emission by the flash light emitting unit 36.

In step 125, the shutter 11, the aperture 10 and the main mirror 2 are reset to their initial positions. In step S126, a decision is judged as to whether or not a predetermined length of time has elapsed after activating the halfway press timer. If a negative judgement is made in step S126 i.e., the predetermined length of time has not yet elapsed, the operation returns to step S101 to repeat the processing, whereas if an affirmative judgement is made, the processing ends.

Figure 18:
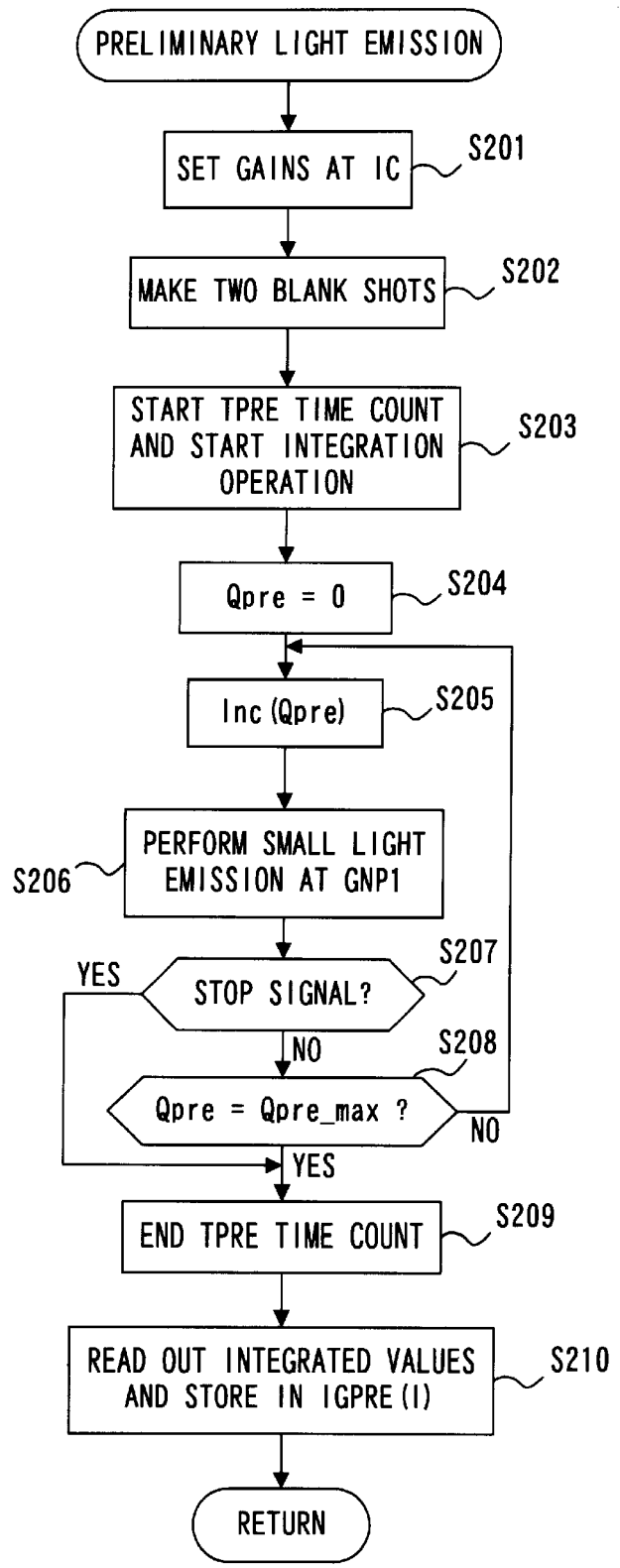
FIG. 18 is a flowchart of the control procedure implemented during the preliminary light emission in the electronic flash controlling device in the embodiments.

FIG. 18 presents a flowchart of the subroutine executed in the control procedure implemented in conformance to the flash photographing control program by the camera microcomputer 30 as shown in the flowchart in FIG. 17. The flowchart in FIG. 18 shows the method employed to implement the preliminary light emission in step S113 in FIG. 17.

In step S201, gains DApre(i) to be actually set at the amplifiers of the flash metering unit 22 are calculated through the formula in (expression 8) below by using the gain calculation command values GaV(i) calculated in step S112 as explained earlier.

$$DApre(i)=(pre\_level(i)-GaV(i)\times pre\_gamma)\times T/Tref(i=1\sim5) \quad \text{(expression 8)}$$

In the expression above, pre_level (i) represents a predetermined reference value of the preliminary light emission flash control level and pre_gamma represents the gamma adjustment value. T represents the current temperature and Tref represents the temperature set in advance for the adjustment. It is to be noted that since an amplifier gain setting becomes higher as the voltage at the DA terminal of the flash metering unit 22 becomes lower, GaV(i)×pre_gamma is subtracted from pre_level in (expression 8). The gains DApre thus calculated are set at the flash metering unit 22 through the method shown in FIG. 8.

In step S202 the flash light emitting unit 36 makes two blank shots. In step S203, a time count for the length of time Tpre over which the preliminary light emission integration operation is to be performed starts. At the same time, the IS terminal at the flash metering unit 22 is lowered to L level, thereby starting the preliminary light emission integration operation. In step S204, 0 is set for the variable Qpre representing the number of small light emissions performed in the preliminary light emission. Qpre indicates the number of small light emissions which does not include the number of blank shots.

In step S205, 1 is added to the number of small light emissions Qpre. In step S206, the flash light emitting unit 36 is engaged in a small light emission at the light emission quantity GNp1. In step S207, adecision is judged as to whether or not a stop signal has been output. If an affirmative judgement is made in step S207 that a stop signal has been output, the operation proceeds to step S209. If, on the other hand, a negative judgement is made in step S207, the operation proceeds to step S208.

In step S208, a decision is judged as to whether or not the number of small light emissions Qpre has reached the preset upper limit Qpre_max. If a negative judgement is made in step S208, the operation returns to step S205.

In step S209, the time count for the length of time tpre for the preliminary light emission integration operation ends. In step S210, the integrated preliminary light emission values IGpre(I) for the individual areas S1~S5 are read out through the method shown in FIG. 9 and stored. Then, the operation makes a return.

It is to be noted that in the preliminary light emission operation in the flowchart in FIG. 18 explained above, the preliminary light emission is not re-executed. If it is judged in step S115 in FIG. 17 that the preliminary light emission is to be re-executed, the processing in steps S202 and S204 in FIG. 18 is skipped when performing the second preliminary light emission. In other words, when executing the second preliminary light emission, the number of small light emissions performed in the second preliminary light emission is added to the number of small light emissions performed in the first preliminary light emission in step S205 to use the sum as the number of small light emissions Qpre.

Figure 19:
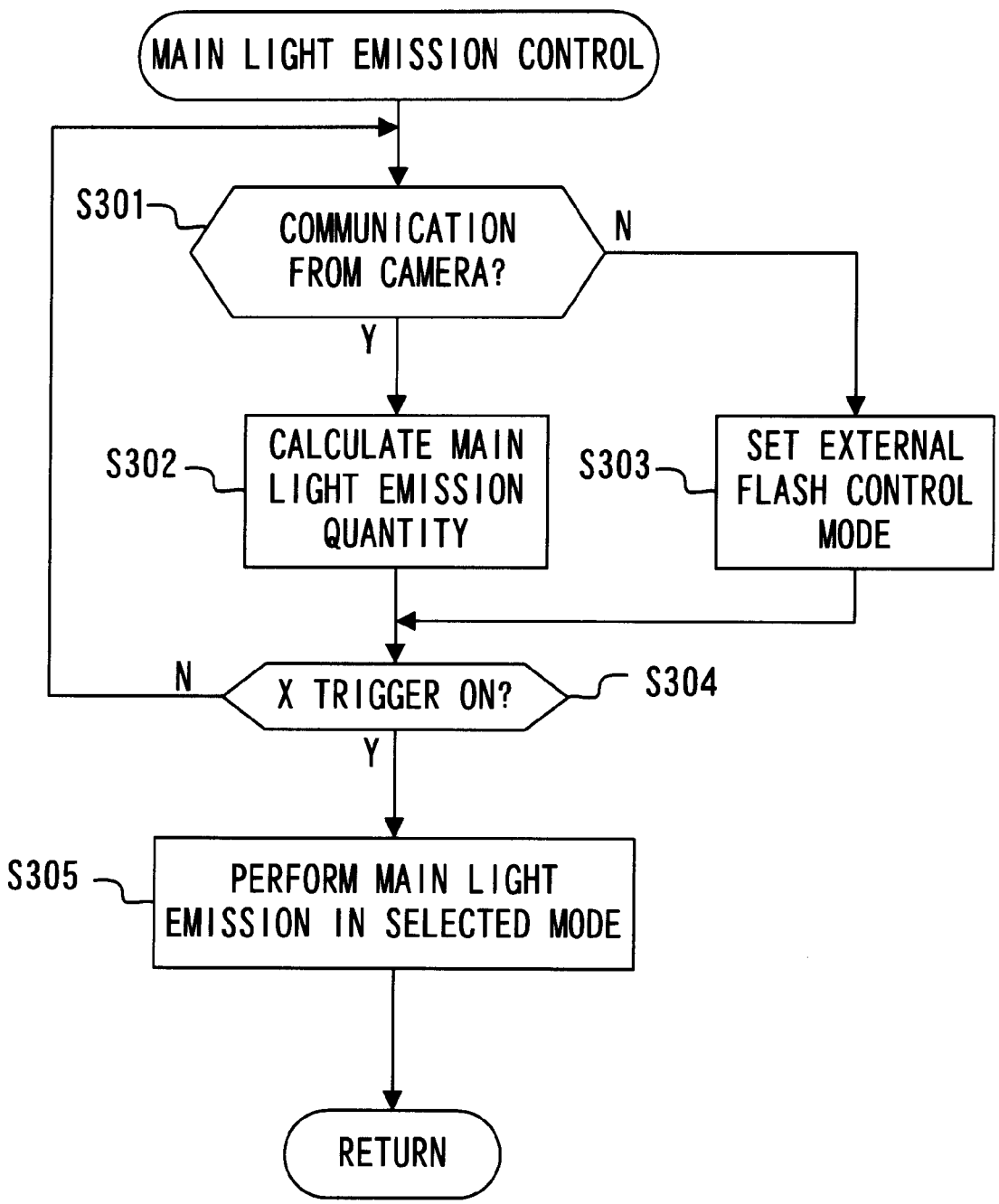
FIG. 19 presents a flowchart of the control procedure implemented during the main light emission by the electronic flash controlling device in the embodiment.

Next, the main light emission control implemented by the electronic flash controlling device in the embodiment is explained in reference to FIG. 19. The main light emission is controlled by the electronic flash microcomputer 35 of the electronic flash device 53. FIG. 19 presents a flowchart of the processing procedure executed for the main light emission control in the electronic flash microcomputer 35.

In step S301, a decision is judged as to whether or not the main light emission quantity instruction value kgn for calculating the main light emission quantity and the number of invalid small light emissions stn have been provided through communication with the camera microcomputer 30. This processing corresponds to the processing performed in step S122 in FIG. 17.

If an affirmative judgement is made in step S301, the operation proceeds to step S302 for a flash control mode 1 to calculate the main light emission quantity through a method of the known art. If, on the other hand, it is judged in step S301 that no communication has been performed from the camera microcomputer 30, the operation proceeds to step S303. In step S303, an external flash control mode (flash control mode 2) is set at the electronic flash device 53.

In step S304, a decision is judged as to whether or not a light emission trigger signal (X signal) has been output. If an affirmative judgement is made in step S304, the operation proceeds to step S305. If a negative judgement is made in step S304, on the other hand, the operation returns to step S301.

In step S305, the main light emission is performed in the selected mode. It is to be noted that if the flash control mode 1 has been selected, the electronic flash microcomputer 35 stops the light emission once the quantity of light emitted by the flash light emitting unit 36, which is detected by the light emission monitor unit 37 reaches the main light emission quantity that has been calculated. If the flash control mode 2, i.e., the external flash control mode, has been selected, on the other hand, the electronic flash microcomputer 35 employs a sensor (not shown) internally provided at the electronic flash device 53 to detect the reflected light from the subject and stops the light emission once the level of the reflected light reaches a predetermined value.

Next, a brief explanation is given on the method employed to calculate the weights wt(i) and the level correction quantity (the flash control correction quantity) ΔY in step S120 in FIG. 17.

First, the subject reflectances RefEV(i) corresponding to the individual areas S1~S5 are calculated using GV(i) in the areas S1~S5 calculated through (expression 5) as explained earlier, in order to calculate the weights wt(i) and the level correction quantity ΔY.

$$\text{Ref}EV(i)=2\times X+AV-GV(i)(i=1\sim5) \qquad \text{(expression 9)}$$

X represents the photographing distance (unit: m) and AV represents the photographic aperture value (unit: AV). It is to be noted that the photographing distance X may be calculated based upon, for instance, the distance over which the lens optical system 31 has moved, which is detected by the distance encoder 32 at the lens main body 52.

The subject reflectances RefEV(i) are each a variable that is set to 0 if the reflectance equals a standard value, that is set to +1 if the reflectance is higher by 1 level (+1 level) relative to the standard value, that is set to −1 if the reflectance is lower by 1 level (−1 level) relative to the standard value and so forth.

Using the subject reflectances RefEV(i) calculated through (expression 9), weighting values RefG(i) for the individual areas S1~S5 are calculated in correspondence to their reflectances.

$$\text{Ref}G(i)=1/(2^{Abs(RefEV(i))})(i=1\sim5) \qquad \text{(expression 10)}$$

Figure 20:
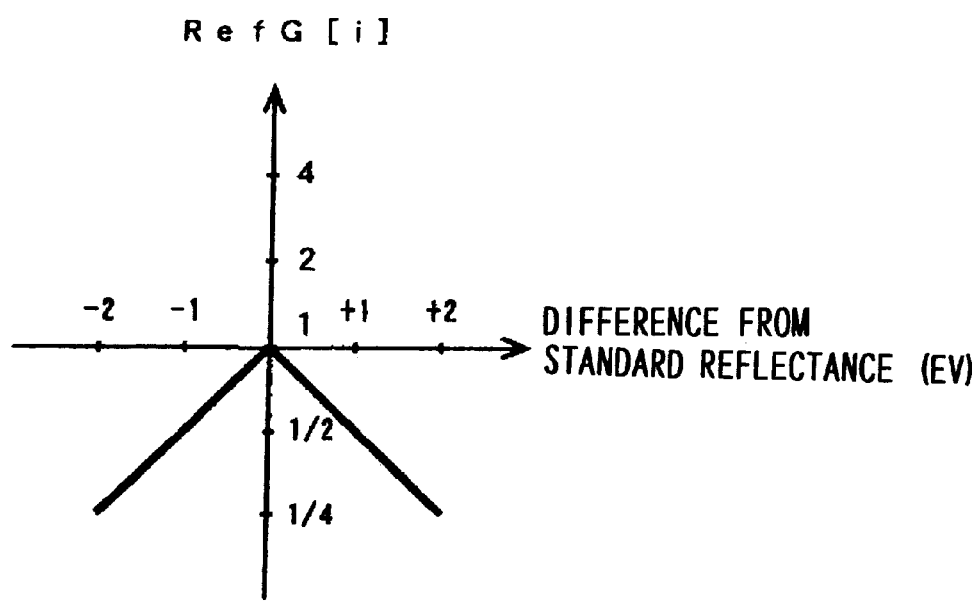
FIG. 20 schematically illustrates the relationship between the reflectance and a weighting value RefG(i)

Abs( ) is a function that determines the absolute number within ( ). As shown in FIG. 20, a weighting value RefG(i) is 1 if the subject reflectance RefEV(i) equals the standard value (0). In addition, the weighting value RefEV(i) becomes smaller as the subject reflectance RefEV(i) deviates further away from the standard value (0).

The weights wt(i) for the areas S1~S5 are individually calculated as expressed below, using the weighting values RefG(i).

$$wt(i)=\text{Ref}G(i)/\Sigma(\text{Ref}G(i))(i=1\sim5) \qquad \text{(expression 11)}$$

A reflectance correction value Ref(Main) for the entire photographic field is calculated using RefEV(i) calculated through (expression 9) and the weights wt(i) calculated through (expression 11).

$$\text{Ref}(\text{Main})=\log2(\Sigma(wt(i)\times2^{RefEV(i)}))(i=1\sim5) \qquad \text{(expression 12)}$$

Figure 21:
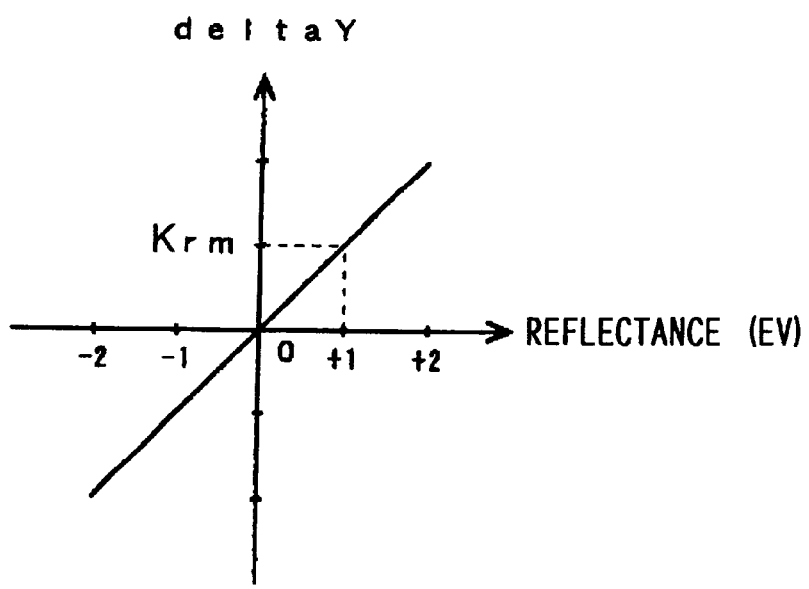
FIG. 21 schematically illustrates the relationship between the reflectance and the main light emission quantity correction value $\Delta Y$.

Using the reflectance correction value Ref (Main) thus calculated, the main light emission quantity correction value ΔY is now calculated through the following formula.

$$\Delta Y=krm\times\text{Ref}(\text{Main}) \qquad \text{(expression 13)}$$

krm represents a constant used to adjust the correction extent Ref(Main) of the subject reflectance. For instance, krm may be set to approximately 0.5. krm may be a value that can be varied as necessary. FIG. 21 shows the relationship between the subject reflectance and the main light emission quantity correction value ΔY. As shown in FIG. 21, an increase in the reflectance results in an increase in the main light emission quantity correction value ΔY.

As explained above, the electronic flash controlling device according to the present invention sets the maximum light emission quantity for the preliminary light emission in correspondence to the type of the electronic flash device 53 mounted at the camera main body 51. In more specific terms, the upper limit Qpre_max to the number of small light emissions performed in the preliminary light emission is set in conformance to the type of the electronic flash device 53. The upper limit Qpre_max to the number of small light emissions is calculated based upon the maximum main light emission quantity GNh and the light emission quantity GNp1 per small light emission that are inherent to a given electronic flash device 53. Since control is implemented during the preliminary light emission by ensuring that the number of small light emissions does not exceed the upper limit Qpre_max, it is possible to assure a sufficient light emission quantity for the main light emission even as the required photographic field information is obtained through the preliminary light emission. Even when the preliminary light emission is re-executed due to the presence of a mirror or the like with a high reflectance in the photographic field, control is achieved so as to ensure that the total number of small light emissions does not exceed the upper limit Qpre_max.

Thus, particularly, even when an electronic flash device 53 with a small maximum main light emission quantity is mounted, a preliminary light emission can be performed while assuring a sufficient light emission quantity for the main light emission.

(Variations of the Embodiment)

The maximum light emission quantity for the preliminary light emission may be set in advance at a preliminary light emission regulating unit (not shown) at the electronic flash microcomputer 35 of the electronic flash device 53 in the electronic flash controlling device according to the present invention. The preliminary light emission regulating unit regulates the actual quantity of light emitted for the preliminary light emission by the flash light emitting unit 36, i.e., the upper limit to the number of small light emissions performed for the preliminary light emission in this example, in response to an instruction for the preliminary light emission issued by the camera microcomputer 30.

Figure 22:
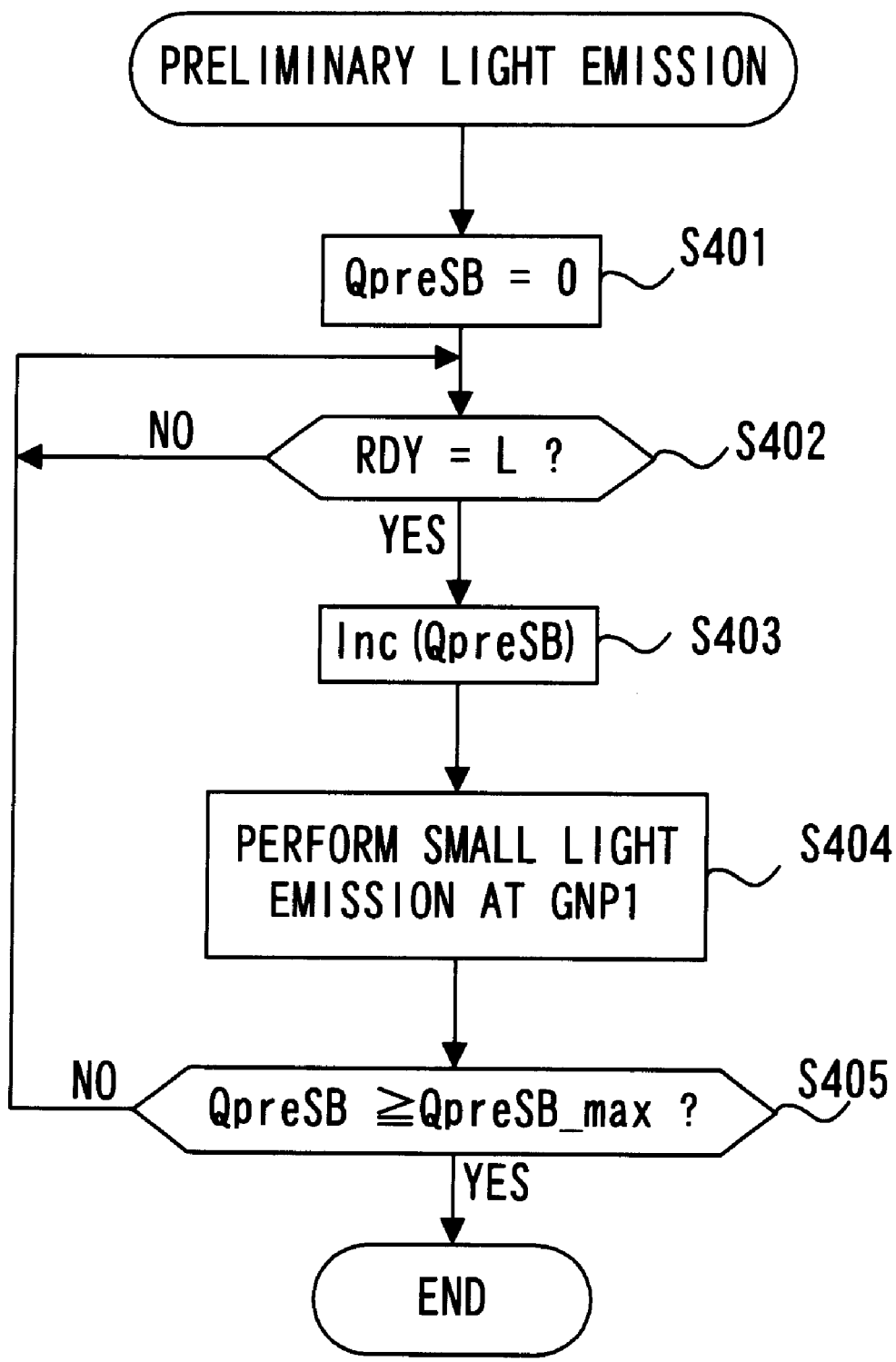
FIG. 22 is a flowchart of the control procedure implemented during the preliminary light emission by the electronic flash microcomputer in the electronic flash controlling device achieved in a variation of the embodiment of present invention.

FIG. 22 presents a flowchart of the processing procedure implemented during the preliminary light emission control by the electronic flash microcomputer 35 in a variation of the embodiment. QpreSB represents the number of small light emissions counted by the electronic flash microcomputer 35. QpreSB_max represents the upper limit to the number of small light emissions set in advance at the preliminary light emission regulating unit of the electronic flash microcomputer 35.

In step S401 following the two blank shots, 0 is set for the number of small light emissions QpreSB. In step S402, a decision is judged as to whether or not an RDY signal for enabling a small light emission has been input from the camera microcomputer 30. If an affirmative judgement is made in step S402, the operation proceeds to step S403. In step S403, 1 is added to QpreSB. In step S404, the flash light emitting unit 36 is engaged in a small light emission performed at the guide number GNp1.

In step S405, a decision is judged as to whether or not the number of small light emissions QpreSB is equal to or higher than the preset upper limit QpreSB_max. If an affirmative judgement is made in step S405, i.e., if the number of small light emissions QpreSB is equal to or larger than the upper limit QpreSB_max, no more small light emission is performed. If, on the hand, a negative judgement is made in step S405, the operation returns to step S402.

As explained above, an advantage similar to that realized in the embodiment is achieved by setting in advance the upper limit QpreSB_max to the number of small light emissions, i.e., the maximum light emission quantity for the preliminary light emission, at the electronic flash microcomputer 35 of the electronic flash device 53 as well. If the upper limit QpreSB_max to the number of small light emissions set at the electronic flash microcomputer 35 is smaller than the upper limit Qpre_max to the number of small light emissions calculated at the camera microcomputer 30, the number of small light emissions is limited in conformance to the upper limit QpreSB_max set at the electronic flash microcomputer 35. As a result, a sufficient light emission quantity for the main light emission can be secured with a higher degree of reliability.

It is to be noted that if the upper limit Qpre_max to the number of small light emissions calculated at the camera microcomputer 30 is smaller than the upper limit QpreSB_max to the number of small light emissions set at the electronic flash microcomputer 35, priority is given to the upper limit Qpre_max calculated at the camera microcomputer 30, since the camera microcomputer 30 does not output an RDY signal once the number of small light emissions exceeds the upper limit Qpre_max.

The upper limit QpreSB_max to the number of small light emissions set at the electronic flash microcomputer 35 may be varied in conformance to the state of the lens zooming operation or the like.

While an explanation has been given in reference to the embodiment on an example in which the present invention is adopted in a digital still camera employing an image-capturing element such as a CCD, the present invention may be adopted in a similar manner in conjunction with a camera which exposes silver halide film.

An explanation has been given on an example in which the upper limit Qpre_max to the number of small light emissions is set when the preliminary light emission is achieved by repeating small light emissions. However, the present invention may also be adopted when the preliminary light emission is achieved through a single light emission as well. In other words, the present invention may be adopted in any application as long as the maximum preliminary light emission quantity for the preliminary light emission is calculated based upon the maximum main light emission quantity of a given electronic flash device to secure a sufficient light emission quantity for the main light emission.

The above described embodiments are examples, and various modifications can be made without departing from the spirit and scope of the invention.

What is claimed is:

1. An electronic flash controlling device employed to control a flash light emitting unit that performs a main light emission and a preliminary light emission prior to the main light emission, comprising:

a maximum preliminary light emission quantity setting unit that sets a maximum preliminary light emission quantity for the preliminary light emission during which a smaller quantity of light is emitted than a maximum light emission quantity based upon maximum light emission quantity information regarding a total light emission quantity which the flash light emitting unit is capable of generating; and a preliminary light emission executing unit that engages the flash light emitting unit in the preliminary light emission by using the maximum preliminary light emission quantity set by said maximum preliminary light emission quantity setting unit as an upper limit.

2. An electronic flash controlling device according to claim 1, wherein:

said preliminary light emission executing unit engages the flash light emitting unit to perform small light emissions repeatedly at a predetermined light emission quantity to execute the preliminary light emission.

3. An electronic flash controlling device according to claim 2, wherein:

said maximum preliminary light emission quantity setting unit sets the maximum preliminary light emission quantity for the preliminary light emission based upon unit light emission quantity information regarding a unit light emission quantity for the small light emissions as well as the maximum light emission quantity information.

4. An electronic flash controlling device according to claim 3, wherein:

said maximum preliminary light emission quantity setting unit sets the maximum preliminary light emission quantity by setting an upper limit to a number of small light emissions to be performed repeatedly.

5. An electronic flash controlling device according to claim 3, wherein:

said maximum preliminary light emission quantity setting unit sets the maximum preliminary light emission quantity based upon a ratio of the maximum light emission quantity information and said unit light emission quantity information.

6. A camera having an electronic flash controlling device according to claim 1, wherein:

said maximum preliminary light emission quantity setting unit sets the maximum preliminary light emission quantity by receiving maximum light emission quantity information transmitted from an electronic flash device that includes the flash light emitting unit.

7. A camera having an electronic flash controlling device according to claim 2, wherein:

said maximum preliminary light emission quantity setting unit sets the maximum preliminary light emission quantity by receiving maximum light emission quantity information transmitted from an electronic flash device that includes the flash light emitting unit.

8. A camera having an electronic flash controlling device according to claim 3, wherein:

said maximum preliminary light emission quantity setting unit sets the maximum preliminary light emission quantity by receiving maximum light emission quantity information and unit light emission quantity information transmitted from an electronic flash device that includes the flash light emitting unit.

9. A camera having an electronic flash controlling device according to claim 4, wherein:

said maximum preliminary light emission quantity setting unit sets the maximum preliminary light emission quantity by receiving maximum light emission quantity information and unit light emission quantity information transmitted from an electronic flash device that includes the flash light emitting unit.

10. A camera having an electronic flash controlling device according to claim 5, wherein:

said maximum preliminary light emission quantity setting unit sets the maximum preliminary light emission quantity by receiving maximum light emission quantity information and unit light emission quantity information transmitted from an electronic flash device that includes the flash light emitting unit.

11. An electronic flash controlling system comprising:

a camera main body having a maximum preliminary light emission quantity setting unit that sets a maximum preliminary light emission quantity for a preliminary light emission during which a smaller quantity of light is emitted than a maximum light emission quantity, based upon maximum light emission quantity information regarding a total light emission quantity which a flash light emitting unit is capable of generating, and a preliminary light emission executing unit that issues an instruction to perform the preliminary light emission to the flash light emitting unit by using the maximum preliminary light emission quantity set by said maximum preliminary light emission quantity setting unit as an upper limit; and an electronic flash device that can be detachably mounted at said camera main body, having said flash light emitting unit that performs a main light emission and the preliminary light emission prior to the main light emission and a preliminary light emission regulating unit that regulates said flash light emitting unit to disallow a preliminary light emission which results in a light emission quantity exceeding a predetermined preliminary light emission quantity even if the instruction has been issued from said camera main body to perform the preliminary light emission which results in the light emission quantity exceeding the predetermined preliminary light emission quantity.

12. An electronic flash controlling system according to claim 11, wherein:

said preliminary light emission executing unit issues an instruction to perform small light emissions repeatedly at a predetermined light emission quantity to said flash light emitting unit and sets the maximum preliminary light emission quantity by setting an upper limit to a number of small light emissions; and said preliminary light emission regulating unit regulates the small light emissions at said flash light emitting unit if the upper limit to the number of small light emissions set by said preliminary light emission executing unit exceeds a number of preliminary light emissions corresponding to a predetermined preliminary light emission quantity.

* * * * *